(12) United States Patent
Harada et al.

(10) Patent No.: US 11,991,619 B2
(45) Date of Patent: May 21, 2024

(54) TERMINAL, BASE STATION, RADIO COMMUNICATION METHOD AND SYSTEM

(71) Applicant: NTT DOCOMO, INC., Tokyo (JP)

(72) Inventors: Hiroki Harada, Tokyo (JP); Daiki Takeda, Tokyo (JP); Tomoya Ohara, Tokyo (JP); Hideaki Takahashi, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/054,074

(22) PCT Filed: May 10, 2018

(86) PCT No.: PCT/JP2018/018124
§ 371 (c)(1),
(2) Date: Nov. 9, 2020

(87) PCT Pub. No.: WO2019/215872
PCT Pub. Date: Nov. 14, 2019

(65) Prior Publication Data
US 2021/0243680 A1    Aug. 5, 2021

(51) Int. Cl.
*H04W 48/12*    (2009.01)
*H04W 48/16*    (2009.01)
*H04W 72/04*    (2023.01)
*H04W 72/23*    (2023.01)

(52) U.S. Cl.
CPC ........... *H04W 48/12* (2013.01); *H04W 48/16* (2013.01); *H04W 72/23* (2023.01)

(58) Field of Classification Search
CPC ... H04W 48/12; H04W 48/16; H04W 72/042; H04W 72/23; H04L 1/0045; H04L 1/0072; H04L 1/1822; H04L 5/0023; H04L 27/26025; H04L 5/0082; H04L 5/0091; H04L 5/0048; H04L 5/0053; H04L 27/261
See application file for complete search history.

(56) References Cited

U.S. PATENT DOCUMENTS

| | | |
|---|---|---|
| 2013/0301549 A1 | 11/2013 | Chen et al. |
| 2014/0128085 A1 | 5/2014 | Charbit |
| 2014/0177562 A1 | 6/2014 | Li |

(Continued)

OTHER PUBLICATIONS

International Search Report issued in PCT/JP2018/018124 dated Jun. 19, 2018 (2 pages).

(Continued)

*Primary Examiner* — Walli Z Butt
*Assistant Examiner* — Thad N Defauw
(74) *Attorney, Agent, or Firm* — Osha Bergman Watanabe & Burton LLP

(57) ABSTRACT

A terminal is disclosed including a receiver that receives configuration information regarding a physical downlink control channel (PDCCH) to configure a common search space; and a processor that monitors downlink control information in the common search space based on the configuration information, wherein the configuration information includes information regarding a search space that is able to be specified by bits in an index of a master information block (MIB) and information regarding a search space index associated with a given search space. In other aspects, a radio communication method, a base station, and a system are also disclosed.

4 Claims, 16 Drawing Sheets

```
MIB
MIB ::= SEQUENCE {
...
pdcch-ConfigSIB1    INTEGER (0..255),
...
}
```
4 LEAST SIGNIFICANT BITS

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {$N^{CORESET}_{symb}$, if i is odd} |
| 2 | 2 | 1 | 1 | 0 |
| 3 | 2 | 2 | 1/2 | {0, if i is even}, {$N^{CORESET}_{symb}$, if i is odd} |
| 4 | 5 | 1 | 1 | 0 |
| 5 | 5 | 2 | 1/2 | {0, if i is even}, {$N^{CORESET}_{symb}$, if i is odd} |
| 6 | 7 | 1 | 1 | 0 |
| 7 | 7 | 2 | 1/2 | {0, if i is even}, {$N^{CORESET}_{symb}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

(56) References Cited

U.S. PATENT DOCUMENTS

| | | | |
|---|---|---|---|
| 2019/0068348 A1* | 2/2019 | Nam | H04L 5/0053 |
| 2019/0222357 A1* | 7/2019 | Huang | H04W 72/0446 |
| 2019/0306827 A1* | 10/2019 | Agiwal | H04L 5/001 |
| 2019/0327767 A1* | 10/2019 | Islam | H04B 7/0695 |
| 2021/0126692 A1* | 4/2021 | Chung | H04B 7/0626 |
| 2021/0329556 A1* | 10/2021 | Kim | H04W 52/0235 |

OTHER PUBLICATIONS

Written Opinion of the International Searching Authority issued in PCT/JP2018/018124 dated Jun. 19, 2018 (5 pages).

Qualcomm Incorporated; "Remaining system information delivery consideration"; 3GPP TSG-RAN WG1 NR#90, R1-1713376; Prague, Czech Republic; Aug. 21-25, 2017 (9 pages).

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

Office Action issued in the counterpart European Patent Application No. 18918247.0, dated Dec. 23, 2021 (19 pages).

ZTE, Sanechips; "Additional periodicity values for NR signals/channels"; 3GPP TSG RAN WG1 Meeting AH 1801, R1-1800554; Vancouver, Canada; Jan. 22-26, 2018 (8 pages).

Huawei, HiSilicon; "Definition of dci-Format0-0-AndFormat1-0"; 3GPP TSG-RAN WG2 Meeting #101bis, R2-1806348; Sanya, China; Apr. 16-20, 2018 (4 pages).

Qualcomm Incorporated; "Control resource set and search space"; 3GPP TSG RAN WG1 Meeting #90, R1-1713418; Prague, Czech Republic; Aug. 21-25, 2017 (4 pages).

Office Action issued in Indian Application No. 202037051819 dated Aug. 26, 2022 (6 pages).

Office Action issued in Indonesian Application No. P00202009498; dated Oct. 24, 2022 (6 pages).

Extended European Search Report in counterpart European Application No. 18918247.0 dated Jun. 22, 2022 (25 pages).

Samsung; "Remaining details on remaining minimum system information delivery"; 3GPP TSG RAN WG1 #90b, R1-1717578; Prague, Czech Republic; Oct. 9-13, 2017 (9 pages).

Vivo; "Misalignment of CSS in PBCH and dedicated signaling"; 3GPP TSG-RAN WG2 Meeting #101bis, R2-1804882; Sanya, China; Apr. 16-20, 2018 (8 pages).

Samsung; "On Search Space Design"; 3GPP TSG RAN WG1 Meeting NR#3, R1-1715979; Nagoya, Japan; Sep. 18-21, 2017 (8 pages).

Samsung; "Configuration and Functionalities of Common Search Space"; 3GPP TSG RAN WG1 #89, R1-1707998; Hangzhou, China; May 15-19, 2017 (2 pages).

InterDigital Inc.; "SIB and MIB provisioning in UE's active BWP"; 3GPP TSG-RAN WG2 NR #101-bis, R2-1804812; Sanya, China; Apr. 16-20, 2018 (4 pages).

Office Action in the counterpart Chinese Application No. 201880095555.5, dated Aug. 1, 2023 (20 pages).

* cited by examiner

```
MIB ::=    SEQUENCE {
...
pdcch-ConfigSIB1       INTEGER (0..255),
...
}
```

4 LEAST SIGNIFICANT BITS

| Index | $O$ | Number of search space sets per slot | $M$ | First symbol index |
|---|---|---|---|---|
| 0 | 0 | 1 | 1 | 0 |
| 1 | 0 | 2 | 1/2 | {0, if $i$ is even}, {$N_{symb}^{CORESET}$, if $i$ is odd} |
| 2 | 2 | 1 | 1 | 0 |
| 3 | 2 | 2 | 1/2 | {0, if $i$ is even}, {$N_{symb}^{CORESET}$, if $i$ is odd} |
| 4 | 5 | 1 | 1 | 0 |
| 5 | 5 | 2 | 1/2 | {0, if $i$ is even}, {$N_{symb}^{CORESET}$, if $i$ is odd} |
| 6 | 7 | 1 | 1 | 0 |
| 7 | 7 | 2 | 1/2 | {0, if $i$ is even}, {$N_{symb}^{CORESET}$, if $i$ is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

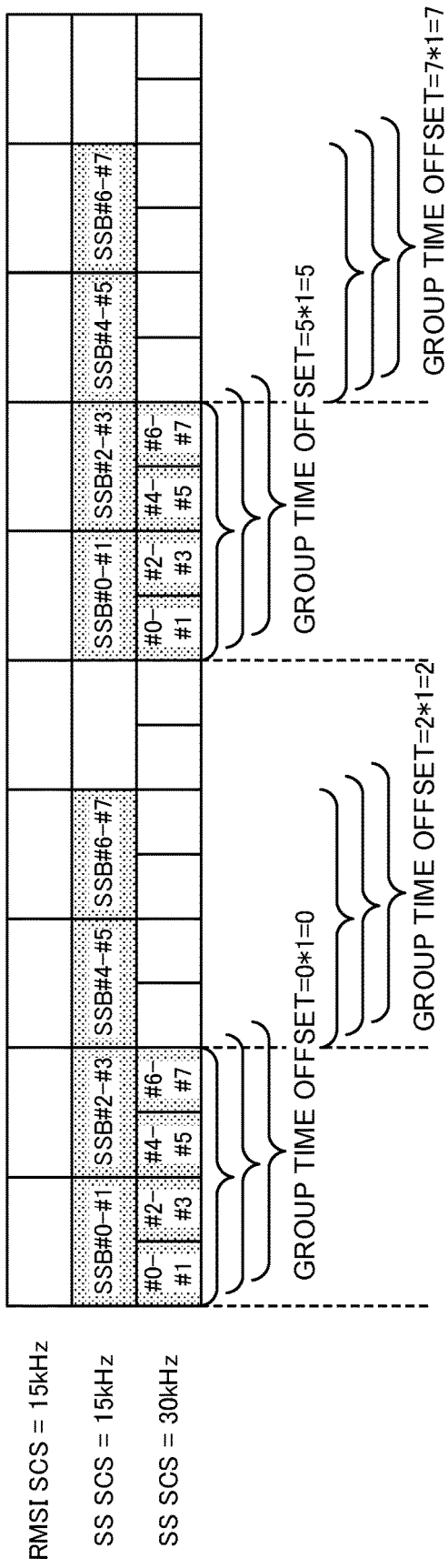
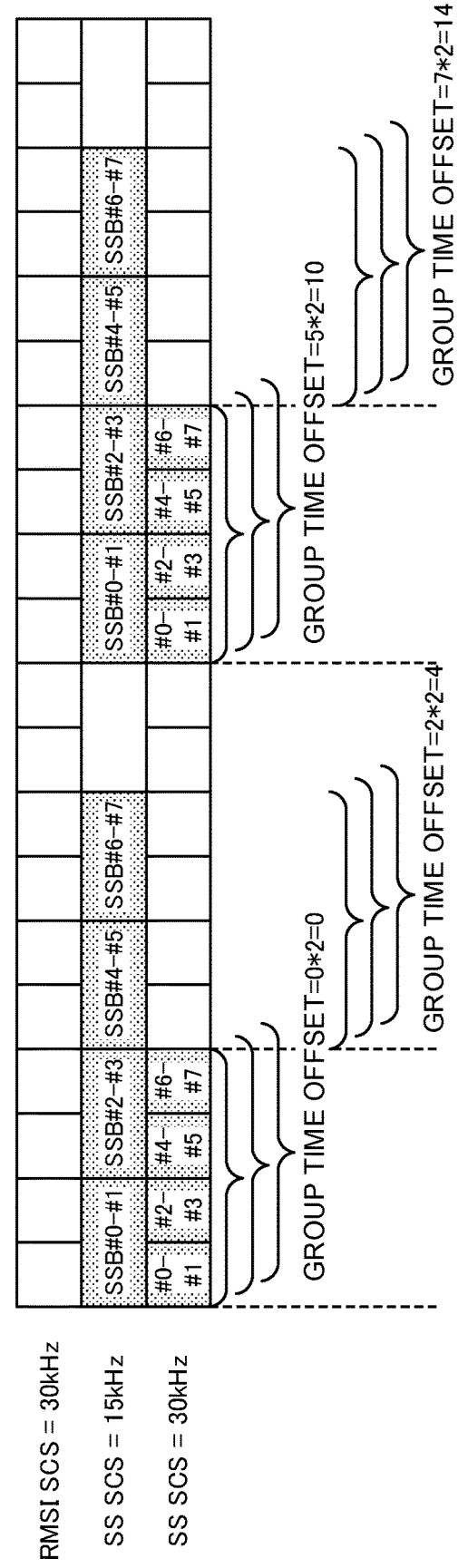

US 11,991,619 B2

TERMINAL, BASE STATION, RADIO COMMUNICATION METHOD AND SYSTEM

TECHNICAL FIELD

The present disclosure relates to a user terminal and a radio base station in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 14," "LTE Rel. 15" (or later versions), and so on) are also under study.

In existing LTE systems (for example, LTE Rel. 8 to Rel. 13), a radio base station (for example, an eNB (eNode B)) transmits a physical layer control signal (for example, downlink control information (DCI) to a user terminal (UE (User Equipment)) by using a control channel (for example, PDCCH (Physical Downlink Control Channel).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR, 5G, 5G+, Rel. 15 or later versions), studies have been conducted about configuration of a search space for a system information block (SIB) 1, based on indices (also referred to as pdcch-ConfigSIB1, RMSI-PDCCH-Config, and so on) in a master information block (MIB).

For the future radio communication systems, it is assumed that a common search space (CSS) including at least one of the search space for SIB1, a search space for OSI (Other System Information), a search space for paging, and a search space for random access is configured based on information (PDCCH-ConfigCommon) related to a downlink control channel (for example, a PDCCH (Physical Downlink Control Channel) provided through RRC (Radio Resource Control) signaling.

However, the common search space configured based on the PDCCH-ConfigCommon may fail to support a pattern of the search space for SIB1 (for example, at least one of periodicity, an offset, and a timing) that can be configured based on each index in the MIB. As a result, the user terminal may fail to appropriately monitor downlink control information (DCI) in the common search space.

The present invention has been made in view of the above, and an object of the present invention to provide a user terminal and a radio base station that can appropriately control at least one of configuration of a common search space and monitoring of DCI in the common search space.

Solution to Problem

A user terminal according to an aspect of the present disclosure includes a receiving section that receives information related to a common search space and configured to enable configuration of at least periodicity of a search space for a system information block (SIB) 1 configured based on an index in a master information block (MIB), and a control section that controls monitoring of downlink control information in the common search space configured based on information related to the common search space.

Advantageous Effects of Invention

According to an aspect of the present disclosure, at least one of configuration of the common search space and monitoring of DCI in the common search space can be appropriately controlled.

BRIEF DESCRIPTION OF DRAWINGS

FIGS. 2A and 2B are diagrams to show an example of offset of the time position of the SIB1 SS with respect to SSBs;

DESCRIPTION OF EMBODIMENTS

Figure 1:
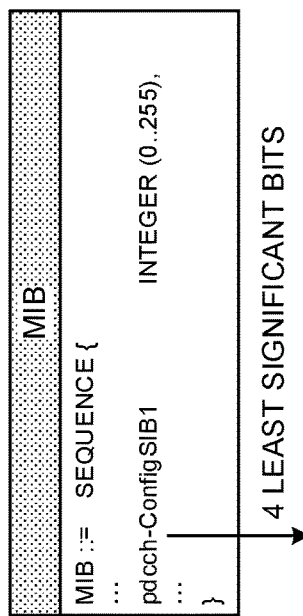
FIG. 1 is a diagram to show an example of determination of a time position of an SIB1 SS based on indices in an MIB.

For future radio communication systems (for example, NR, 5G, 5G+, Rel. 15 or later versions), studies have been conducted about the use of a control resource set (CORESET) for transmission of physical layer control signal (for example, downlink control information (DCI)) from a radio base station (that may also be referred to as, for example, a base station (BS), a transmission/reception point (TRP), an eNB (eNodeB), or gNB (NR NodeB)) to a user terminal.

The CORESET is allocation candidate regions of a downlink control channel (for example, a PDCCH (Physical Downlink Control Channel)). The CORESET may include certain frequency domain resources and certain time domain resources (for example, one or two OFDM symbols and so on) The PDCCH (or DCI) is mapped to certain resource units in the CORESET.

It is sufficient that the certain resource unit is at least one of, for example, a control channel element (CCE), a CCE group including one or more CCEs, a resource element group (REG) including one or more resource elements (RE), one or more REG bundles (REG group), and a physical resource block (PRB).

The user terminal monitors (blind-decodes) the search space (SS) in the CORESET to detect DCI for the user terminal. The search space may include a search space (common search space (CSS)) used for the monitoring of (cell-specific) DCI common to one or more user terminals and a search space (user-specific search space (USS)) used for the monitoring of DCI specific to the user terminal. The CSS may include at least one of (1) to (4) described below.

(1) A search space for SIB1 (also referred to as Type0-PDCCH CSS, SIB1 SS, RMSI (Remaining Minimum System Information) SS, and so on). The SIB1 SS may be a search space for DCI to which cyclic redundancy check (CRC) bits scrambled with a certain identifier (for example, SI-RNTI (System Information-Radio Network Temporary Identifier) are added (search space for DCI including the CRC bits) (search space for the monitoring of DCI used to schedule a PDSCH that transmits SIB1).

(2) A search space for OSI (Other System Information) (also referred to as Type 0A-PDCCH CSS, OSI SS, and so on). The OSI SS may be a search space for DCI to which CRC bits scrambled with a certain identifier (for example, the SI-RNTI) are added (search space for DCI including the CRC bits) (search space for the monitoring of DCI used to schedule a PDSCH that transmits the OSI).

(3) A search space for random access (PA) (also referred to as Type1-PDCCH CSS, RA SS, and so on). The RA SS may be a search space for DCI to which CRC bits scrambled with a certain identifier (for example, an RA-RNTI (Random Access-Radio Network Temporary Identifier), a TC-RNTI (Temporary Cell-Radio Network Temporary Identifier), or a C-RNTI (Cell-Radio Network Temporary Identifier)) are added (search space for DCI including the CRC bits) (search space for the monitoring of the DCI used to schedule a PDSCH that transmits a message for an RA procedure (for example, Random Access Response (message 2) or a message for contention resolution (message 4))).

(4) A search space for paging (also referred to as Type2-PDCCH CSS, paging SS, and so on). The paging SS may be a search space for DCI to which CRC bits scrambled with a certain identifier (for example, P-RNTI (Paging-Radio Network Temporary Identifier) are added (search space for DCI including the CRC bits) (search space for the monitoring of DCI used to schedule a PDSCH transmitting paging).

(Configuration of SIB1 SS Based on Index in MIB)

The user terminal may configure the SIB1 SS based on indices (also referred to as pdcch-ConfigSIB1, RMSI-PDCCH-Config, and so on) in the MIB (Master Information Block) transmitted via a broadcast channel (PBCH (Physical Broadcast Channel)) during initial access.

Specifically, the user terminal may determine the time position (for example, at least one of a slot and a symbol in the slot) of the SIB1 SS associated with a synchronization signal block (SSB) based on the time position of the SSB (also referred to as an index, an SSB index, and so on) and the pdcch-ConfigSIB in the MIB. Here, the SSB is a signal block including a synchronization signal (SS) and a PBCH and may also be referred to as an "SS/PBCH block," and so on.

The time position of the SIB1 SS is also referred to as a PDCCH monitoring occasion for SIB1, a monitoring occasion, a monitoring period, and so on.

FIG. 1 is a diagram to show an example of determination of the time position of the SIB1 SS based on the indices in the MIB. As illustrated in FIG. 1, the MIB may include pdcch-ConfigSIB1 enabling a value of from 0 to 255 to be specified (that is, the pdcch-ConfigSIB1 includes 8 bits). The user terminal may determine a frequency resource for the CORESET for the SIB1 SS (for example, the number of consecutive resource blocks) and a time resource (for example, the number of consecutive symbols), based on 4 most significant bits (MSB) in the pdcch-ConfigSIB1

The user terminal may determine the time position of the SIB1 SS, based on 4 least significant bits (LSB) in the pdcch-ConfigSIB1. The time position of the SIB1 SS may be a certain number of slots (for example, two consecutive slots) starting with a certain slot $n_0$ in a frame with a certain system frame number SFN C. The time position of the SIB1 SS may be defined based on an SSB index i.

For example, in multiplexing pattern 1 of SSB and CORESET, the time position of the SIB1 SS associated with the SSB index i may be two consecutive slots starting with a slot $n_0$ with an index determined by Equation 1 below. For a calculation result of Equation 1 below, in a case where the value of a floor function is an even number, the $SFN_c$ of a frame including the slot $n_0$ is an even number, and in a case where the value of the floor function is an odd number, the $SFN_c$ of the frame including the slot $n_0$ may be an odd number.

$$n_0 = (O \cdot 2^\mu + \lfloor i \cdot M \rfloor) \bmod N_{slot}^{frame,\mu} \qquad \text{[Equation 1]}$$

Here, M and O may be, for example, values associated with a value (index) indicated by the 4 least significant bits of the pdcch-ConfigSIB1 in the table shown in FIG. 1. O may be (a value used to determine) an offset of a slot for the SSB index i (the offset is also referred to as a group time offset, or the like). M may be a certain coefficient for the SSB index i. Note that values in the table shown in FIG. 1 are only illustrative, and that no such limitation is intended.

$\mu$ may be a value based on a subcarrier spacing for reception of the PDCCH in the CORESET, and for example, $\mu \in \{0, 1, 2, 3\}$. For example, $\mu=0$ may indicate a subcarrier spacing of 15 kHz, $\mu=1$ may indicate a subcarrier spacing of 30 kHz, $\mu=2$ may indicate a subcarrier spacing of 60 kHz, and µ=3 may indicate a subcarrier spacing of 120 kHz. $N^{frame,\mu}_{slot}$ may be the number of slots in a frame for each subcarrier spacing.

The index of the first symbol in the CORESET in the slot n (symbol of the first SIB1 SS in the slot $n_0$) may be, for example, a value (value of a first symbol index) associated with a value (index) indicated by the 4 least significant bits of the pdcch-ConfigSIB1 in the table shown in FIG. 1.

FIGS. 2A and 2B are diagrams to show an example of offset of a time position of SIB1 SS with respect to SSBs. In a case that subcarrier spacings of RMSI are 15 kHz and 30 kHz, FIGS. 2A and 2B show the slots in which SSB #0 to SSB #7 at subcarrier spacings of 15 kHz and 30 kHz are allocated in a frame, and a group time offset.

For example, in FIGS. 2A and 2B, SSB #0 to SSB #8 are allocated with a 5-ms periodicity. However, the periodicity of the SSBs is not limited to 5 ms. For example, in Equation 1 described above, the group time offset for the SSB index i is $O \cdot 2^\mu$. In FIG. 2A, µ=0 because the subcarrier spacing is 15 kHz, and in FIG. 2B, µ=1 because the subcarrier spacing is 15 kHz. As described above, O is a value (0, 2, 5, or 7 in FIG. 1) associated with the value (index) indicated by the 4 least significant bits of the pdcch-ConfigSIB1 in the certain table.

In FIGS. 2A and 2B, the slots in which the SIB1 SS is allocated may be a certain number of slots (for example, two slots) starting with the slot $n_0$ determined based on the group time offset $O \cdot 2^\mu$ and an offset (i·M) based on a multiplication result of the SSB index i and the coefficient M (for example, see FIG. 1). The symbol position of the SIB1 SS in the certain number of slots may be determined based on the index of the 4 least significant bits of the pdcch-ConfigSIB1.

Note that, in multiplexing pattern 1 of the SSB and the CORESET, the periodicity of the SIB1 SS is fixed at 20 ms and that the two consecutive slots in one periodicity may be the time position of the SIB1 SS. On the other hand, in multiplexing patterns 2 and 3 of the SSB and the CORESET, the periodicity of the SIB1 SS may be equal to the periodicity of the SSB (SSB periodicity). In multiplexing patterns 2 and 3, for initial access, the SSB periodicity is assumed to be 20 ms, and thus the periodicity of the SIB1 SS may be assumed to be 20 ms.

In multiplexing patterns 2 and 3, the time position of the SIB1 SS associated with the index i of the SSB may be determined based on the SFN associated with the index of the 4 least significant bits of the pdcch-ConfigSIB1, a slot number, and the first symbol index (a table different from the table shown in FIG. 1 may be used).

The user terminal monitors the SIB1 SS determined as described above to detect DCI and receives the SIB1, based on the DCI.

(Configuration of CSS Based on PDCCH-ConfigCommon)

The user terminal may configure at least one of the SIB1 SS, OSI SS, paging SS, and RA SS, based on configuration information related to the PDCCH (also referred to as common PDCCH information, pdcch-ConfigCommon, and so on). The pdcch-ConfigCommon may be reported from the radio base station to the user terminal by RRC (Radio Resource Control) signaling.

As described above, during initial access, the SIB1 SS is configured based on the pdcch-ConfigSIB1 in the MIB. Thus, during initial access, the user terminal may configure at least one of the OSI SS, paging SS, and RA SS, based on the PDCCH-ConfigCommon included in the SIB1.

On the other hand, in a handover (HO) procedure and a cell addition procedure in dual connectivity (DC) or carrier aggregation (CA), the PDCCH-ConfigCommon may be used as configuration information related to the PDCCH for a handover destination cell (target cell, primary cell (PCell)), a primary secondary cell (PSCell) added in DC, and a secondary cell (SCell) added in DC or CA. In this case, the SIB1 SS may be configured based on the PDCCH-ConfigCommon.

Figure 3:
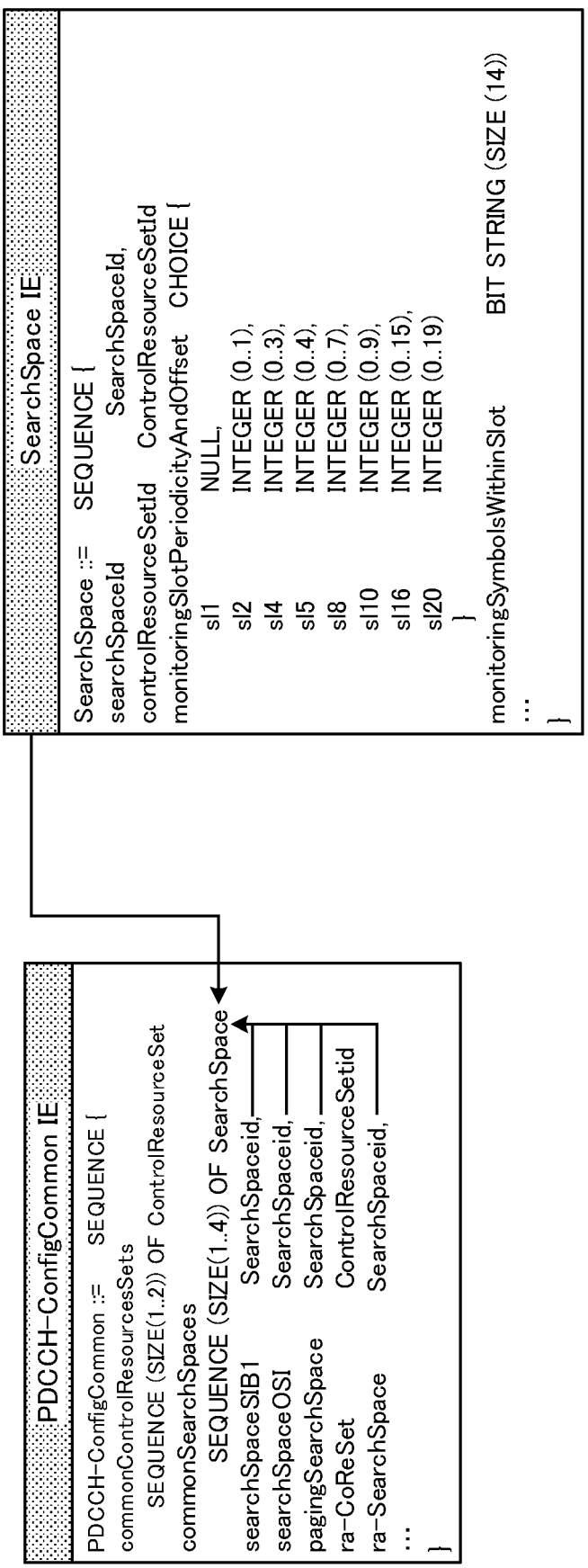
FIG. 3 is a diagram to show an example of PDCCH-ConfigCommon.

FIG. 3 is a diagram to show an example of the PDCCH-ConfigCommon. As shown in FIG. 3, the PDCCH-ConfigCommon may include information related to a certain number of (for example, up to two) CORESETs (also referred to as commonControlResourcesSets, commonCoReSets, common CORESET information, and so on) and information related to a certain number of (for example, up to four) CSSs (also referred to as commonSearchSpaces, SearchSpaces, CSS information, and so on). The user terminal may configure the CORESET, based on the commonControlResourcesSets and configure the CSS, based on the commonSearchSpaces.

The PDCCH-ConfigCommon may include information related to at least one of the search spaces described below.

Information related to the SIB1 SS (also referred to as searchSpaceSIB1, rmsi-SearchSpace, SIB1 SS information, and so on). Note that, in a case where the searchSpaceSIB1 is not included in the PDCCH-ConfigCommon, the time position of the SIB1 SS is determined based on the MIB, as described above.

Information related to the OSI SS (also referred to as searchSpaceOtherSystemInformation, OSI SS information, and so on).

Information related to the paging SS (also referred to as pagingSearchSpace, paging SS information, and so on).

Information related to the RA SS (also referred to as ra-SearchSpace, RA search space information, and so on).

The searchSpaceSIB1, searchSpaceOtherSystemInformation, pagingSearchSpace, and ra-SearchSpace may each be a search space identifier (ID, searchSpaceID), and each searchSpaceID may specify one of up to four search spaces specified by the commonSearchSpaces.

As shown in FIG. 3, the user terminal may respectively determine the time positions of the SIB1 SS, OSI SS, paging SS, and RA SS (also referred to as PDCCH monitoring occasions, monitoring occasions, monitoring periods, and so on), based on the searchSpaceSIB1, searchSpaceOtherSystemInformation, pagingSearchSpace, and ra-SearchSpace.

Specifically, the user terminal may determine the time positions of the SIB1 SS, OSI SS, paging SS, and RA SS, based on information (monitoringSlotPeriodicityAndOffset) related to the periodicity and offset of slots in the search space indicated by each of the searchSpaceSIB1, searchSpaceOtherSystemInformation, pagingSearchSpace, and ra-SearchSpace, and information related to the symbol positions in the slot (monitoringSymbolsWithinSlot).

For example, according to the monitoringSlotPeriodicityAndOffset shown in FIG. 3, the slots in which the CSS (for example, at least one of the SIB1 SS, OSI SS, paging SS, and RA SS) is allocated are configured at one slot granularity and with periodicity of 1, 2, 4, 5, 8, 10, 16, or 20 slots. According to the monitoringSymbolsWithinSlot, the symbol position in the slot of the SS is indicated by a 14-bit bitmap.

Note that, in a case where the searchSpaceOtherSystemInformation, pagingSearchSpace, and ra-SearchSpace are not reported to the user terminal, the user terminal may use the time position of the SIB1 SS configured based on the pdcch-ConfigSIB1 in the MIB as the time position of the OSI SS, paging SS, or RA SS.

As described above, in a case where at least one of the SIB1 SS, OSI SS, paging SS, and RA SS is configured based on the pdcch-ConfigCommon, the monitoringSlotPeriodicityAndOffset shown in FIG. 3 configures the time position of at least one of the SIB1 SS, OSI SS, paging SS, and RA SS with periodicity of up to 20 slots (20 ms in a case of a subcarrier spacing of 15 kHz).

On the other hand, the time position of the SIB1 SS configured based on the pdcch-ConfigSIB1 in the MIB is assumed to be the same as the SSB periodicity and may have periodicity of 5, 10, 20, 40, 80, or 160 ms. Thus, the periodicity of the SIB1 SS is assumed to be 5, 10, 20, 40, 80, or 160 slots for a subcarrier spacing of 15 kHz ($\mu=0$), 10, 20, 40, 80, 160, and 320 slots for a subcarrier spacing of 30 kHz ($\mu=1$), 20, 40, 80, 160, 320, or 640 slots for a subcarrier spacing of 60 kHz ($\mu=2$), and 40, 80, 160, 320, 640, or 1280 slots for a subcarrier spacing of 120 kHz ($\mu=3$).

Therefore, in a case where the periodicity of the CSS (for example, at least one of the SIB1 SS, OSI SS, paging SS, and RA SS) is configured based on the pdcch-ConfigCommon, the periodicity that can be configured based on the pdcch-ConfigSIB1 in the MIB (for example, at least one of the 40-, 80-, 160-, 320-, 640-, and 1280-slot periodicity) may fail to be configured. The offset that can be configured based on the pdcch-ConfigSIB1 in the MIB (for example, the group time offset ($O \cdot 2^\mu$) and the offset based on the SSB (i·M)) may fail to be configured.

In this way, for the CSS configured based on the PDCCH-ConfigCommon, the pattern of the SIB1 SS (for example, at least one of the periodicity, offset, and timing) that can be configured based on the pdcch-ConfigSIB1 in the MIB may fail to be supported. As a result, the user terminal may fail to appropriately monitor the DCI in CSS.

Thus, the inventors of the present invention came up with the idea of supporting the pattern of the SIB1 SS configured based on the pdcch-ConfigSIB1 in the MIB also for the CSS configured based on the PDCCH-ConfigCommon by changing SearchSpace IE, one of information elements (IE) referenced in the PDCCH-ConfigCommon (first aspect) or changing the PDCCH-ConfigCommon instead of changing the SearchSpace IE (second aspect).

The present embodiments will be described below in detail with reference to the drawings. In the present embodiments, the user terminal receives information related to the CSS configured at least to enable configuration of the periodicity of the SIB1 SS configured based on the pdcch-ConfigSIB1 (index) in the MIB. The user terminal controls monitoring of the DCI in the CSS configured based on information related to the CSS.

Here, the information related to the CSS may be the SearchSpace IE (or the monitoringSlotPeriodicityAndOffset in the SearchSpace IE) referenced in the PDCCH-Connfig-Common (first aspect). The information related to the CSS may be at least one of the searchSpaceSIB1, searchSpaceOtherSystemInformation, pagingSearchSpace, and ra-SearchSpace in the PDCCH-ConfigCommon (second aspect). Note that the first aspect and the second aspect may each be indepedently used or may be combined together.

(First Aspect)

In the first aspect, the SearchSpace IE referenced in the PDCCH-ConfigCommon is extended according to all periodicity that can be configured based on the pdcch-ConfigSIB1 in the MIB.

Figure 4:
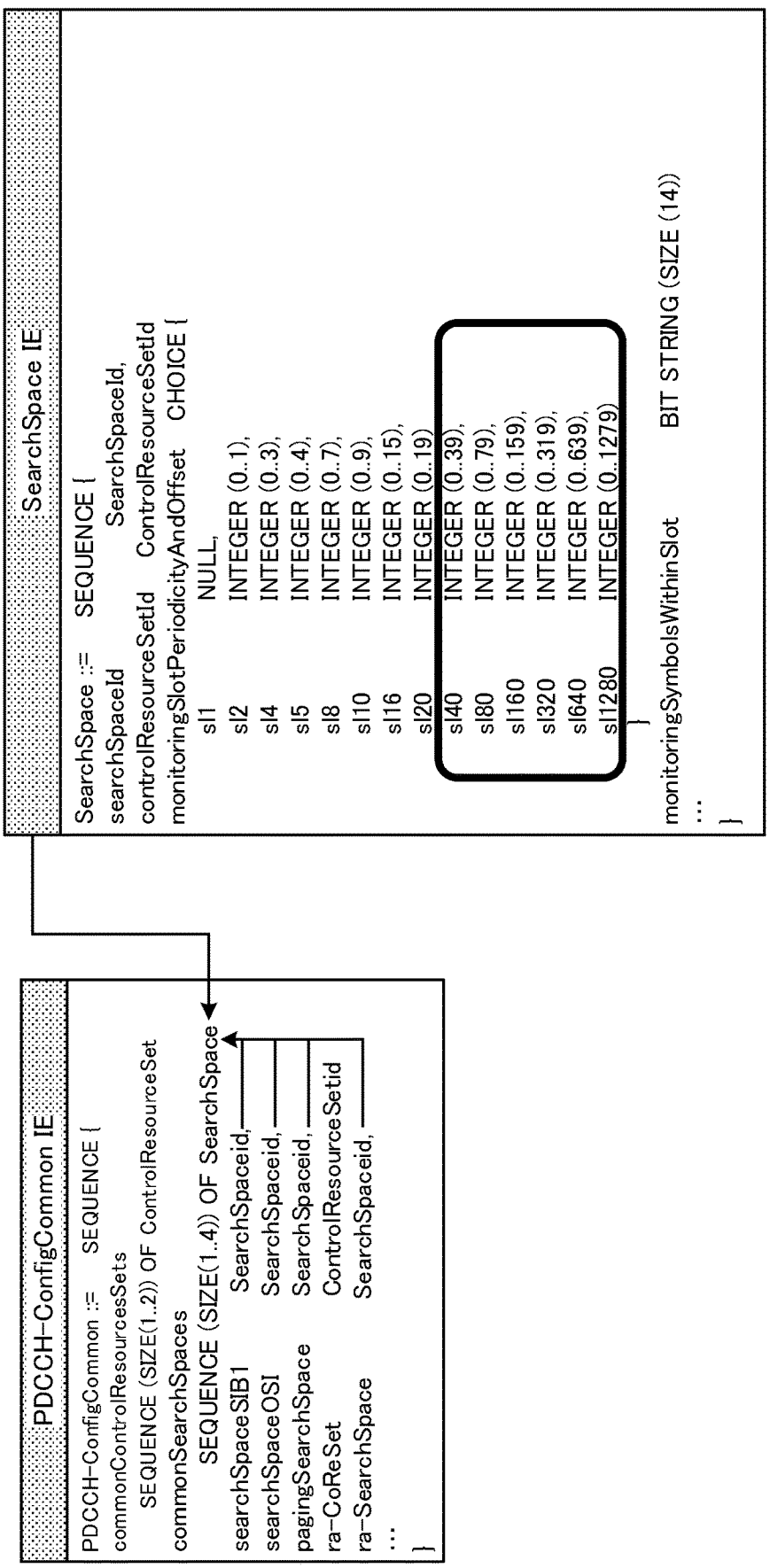
FIG. 4 is a diagram to show an example of a SearchSpace IE according to a first aspect.

FIG. 4 is a diagram to show an example of the SearchSpace IE according to the first aspect. As shown in FIG. 4, as configured values for the monitoringSlotPeriodicityAndOffset in the SearchSpace IE, the 40-, 80-, 160-, 320-, 640-, and 1280-slot periodicity may be added. For the monitoringSlotPeriodicityAndOffset in FIG. 4, offset values for the 40-, 80-, 160-, 320-, 640-, and 1280-slot periodicity are respectively defined to ranges from 0 to 39, from 0 to 79, from 0 to 159, from 0 to 319, from 0 to 639, and from 0 to 1279. Thus, each of the slot periodicity enables an offset to be configured in units of slots.

As illustrated in FIG. 4, by extending the value that can be configured by using the monitoringSlotPeriodicityAndOffset in the SearchSpace IE, the periodicity that can be configured based on the pdcch-ConfigSIB1 in the MIB (for example, at least one of the 40-, 80-, 160-, 320-, 640-, and 1280-slot periodicity) can be configured even when the periodicity of the CSS (for example, at least one of the SIB1 SS, OSI SS, paging SS, and RA SS) is configured based on the pdcch-ConfigCommon.

<Mapping Relationship Between SSB and CSS>

In a case where the SIB1 SS is installed based on the pdcch-ConfigSIB1 in the MIB during initial access, in multiplexing pattern 1 of the SSB and the CORESET, the time position of the SIB1 SS (for example, the slot no) is determined based on the offset based on 0 and M indicated by the 4 least significant bits of the pdcch-ConfigSIB1 (for example, the group time offset $O \cdot 2^\mu$ and the offset based on the multiplication result of the SSB index i and the coefficient M (i·M) as described above (see FIGS. 1, 2A, and 2B).

In multiplexing pattern 2 or 3 of the SSB and the CORESET, the time position of the SIB1 SS (for example, an SFN index $SFN_c$ and a slot index $n_c$) is determined based on the SFN index ($SFN_{SSB,i}$) and the slot index ($n_{SSB,i}$) in which the SSB index i is allocated.

Accordingly, in a case where the SIB1 SS is installed based on the pdcch-ConfigSIB1 in the MIB, a mapping relationship between the SSB and the SIB1 SS is reported based on the pdcch-ConfigSIB1. On the other hand, in the first aspect, in a case where the time position (for example, at least one of periodicity and an offset of a slot) of the CSS (for example, at least one of the SIB1 SS, OSI SS, paging SS, and RA SS) is configured based on the pdcch-ConfigCommon, how to report the mapping relationship between the SSB and the CSS becomes a problem.

Thus, first control to fourth control described below may be used to control the mapping relationship between the SSB and the CSS for a case of configuring the CSS, based on the pdcch-ConfigCommon.

«First Control»

In the first control, the mapping relationship between the SSB and the CSS need not be reported to the user terminal. The user terminal may configure the CSS (for example, at least one of the SIB1 SS, OSI SS, paging SS, and RA SS) with the periodicity configured by the monitoringSlotPeriodicityAndOffset in the SearchSpace IE, and perform monitoring (blind decoding, blind detection) of the CSS by using a receive beam corresponding to an SSB beam (SSB index) detected by the user terminal, based on the configured CSS.

Figure 5A:
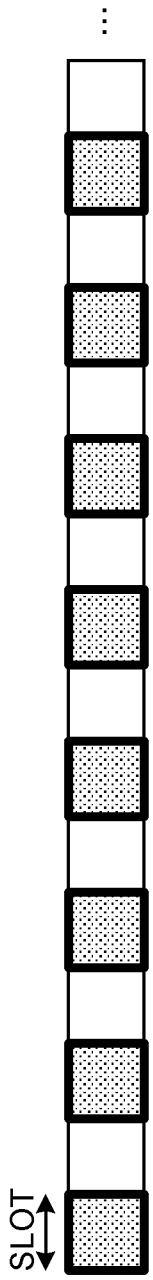
FIGS. 5A to 5C are diagrams to show an example of first control and second control of a mapping relationship between the SSB and CSS according to the first aspect.

FIG. 5A is a diagram to show an example of the first control of the mapping relationship between the SSB and the CSS according to the first aspect. For example, in FIG. 5A, the user terminal monitors the CSS (for example, at least one of the SIB1 SS, OSI SS, paging SS, and RA SS) with the periodicity (here, the 2-slot periodicity) configured by the monitoringSlotPeriodicityAndOffset in the SearchSpace IE indicated by each of the searchSpaceSIB1, searchSpaceOtherSystemInformation, pagingSearchSpace, and ra-SearchSpace in the PDCCH-ConfigCommon.

In FIG. 5A, the radio base station may transmit the DCI using any beam (also referred to as the SSB index, the state of a transmission configuration indicator (TCI) (TCI state), and so on) within the CSS with the configured periodicity (here, the 2-slot periodicity). The user terminal may monitor the CSS with the configured periodicity (here, the 2-slot periodicity) (regardless of the beam (SSB index)) to detect the DCI transmitted within the CSS based on the detected beam (SSB index).

In the first control, the radio base station may transmit the DCI in the CSS corresponding to any beam, enabling an increase in occasions of DCI transmission to allow possible delay to be prevented.

«Second Control»

In the second control, the mapping relationship between the SSB and the CSS may be implicitly reported to the user terminal. The user terminal may determine, based on the implicit reported information, which portion of the CSS (for example, at least one of the SIB1 SS, OSI SS, paging SS, and RA SS) configured with the periodicity indicated by the monitoringSlotPeriodicityAndOffset in the SearchSpace IE is to be monitored, the determined portion corresponding to the SSB (SSB index).

Here, the implicit reported information may be, for example, information (ssb-PositionsInBurst) indicating the time position (SSB index) of the SSB transmitted in a set (SS burst set) including one or more SSBs.

Specifically, based on the above-described ssb-PositionsInBurst, the user terminal may link (associate) the SSB index with each CSS with the periodicity configured by the monitoringSlotPeriodicityAndOffset in the SearchSpace IE. The user terminal may detect at least one of the SSBs (beams) with all SSB indices (or actually transmitted SSB indexes) and monitor the CSS corresponding to the detected SSB.

Figure 5B:
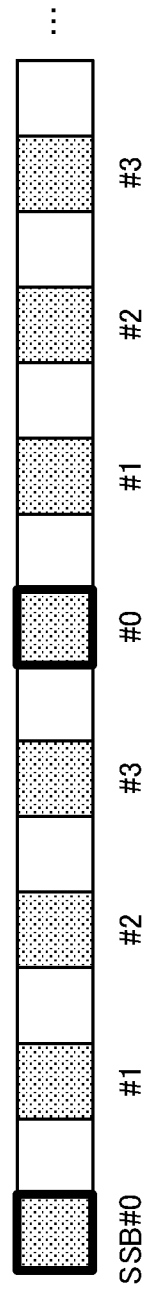

FIG. 5B is a diagram to show an example of the second control of the mapping relationship between the SSB and the CSS according to the first aspect. For example, in FIG. 5B, the CSS is configured with the 2-slot periodicity based on the monitoringSlotPeriodicityAndOffset in the SearchSpace IE. In FIG. 5B, a single SSB index (for example, one of SSB indices #0 to #3) is associated with each CSS with the 2-slot periodicity.

For example, in FIG. 5B, the user terminal detects an SSB (beam) with an SSB index #0 included in SSBs (beams) with SSB indices #0 to #3. Thus, in FIG. 5B, the user terminal monitors the CSS associated with SSB index #0 (here, the CSS with an 8-ms periodicity).

In FIG. 5B, the radio base station may transmit the DCI in a portion of the CSS with the 2-slot periodicity which portion is associated with a specific SSB index (here, SSB index #0). Note that the specific SSB index (also referred to as the TCI state and so on) is, for example, an SSB index detected by the user terminal, and the SSB index may be reported from the user terminal to the radio base station.

Figure 5C:
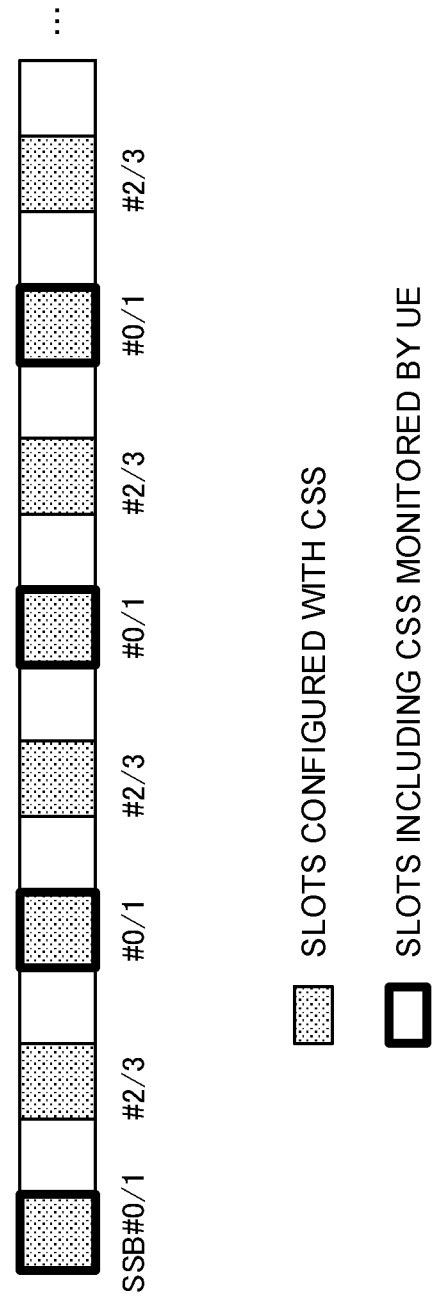

FIG. 5C is a diagram to show another example of the second control of the mapping relationship between the SSB and the CSS according to the first aspect. In FIG. 5B described above, a single SSB index is associated with a CSS with 2-slot periodicity, and FIG. 5C is different from FIG. 5B in that a plurality of SSB indices are associated with the CSS with the 2-slot periodicity.

For example, in FIG. 5C, SSB indices #0 and #1 or SSB indices #2 and #3 are associated with each CSS with the 2-slot periodicity. In FIG. 5C, the user terminal detects the SSB (beam) with SSB index #0 included in the SSBs (beams) with SSB indices #0 to #3. Thus, in FIG. 5C, the user terminal monitors the CSS associated with SSB indices #0 and #1 (here, the CSS with a 4-ms periodicity).

In FIG. 5C, the radio base station may transmit the DCI in a portion of the CSS with the 2-slot periodicity which portion is associated with a specific SSB index (here, SSB indices #0 and #1).

In the second control, the user terminal may monitor the DCI only in the CSS corresponding to a specific beam (SSB index) determined based on the implicit reported information. Thus, in contrast to the first control, the user terminal need not monitor all of the CSS with the periodicity configured by the monitoringSlotPeriodicityAndOffset in the SearchSpace IE, enabling a reduction in CSS monitoring loads.

«Third Control»

In the third control, the mapping relationship between the SSB and the CSS may be explicitly reported to the user terminal. The user terminal may determine, based on the explicit reported information, which portion of the CSS (for example, at least one of the SIB1 SS, OSI SS, paging SS, and RA SS) configured with the periodicity indicated by the monitoringSlotPeriodicityAndOffset in the SearchSpace IE is to be monitored, the determined portion corresponding to the SSB (SSB index).

Here, the explicit reported information may be, for example, information indicating the state of the transmission configuration indicator (TCI) (TCI state) or the SSB index associated with the CSS. For example, the information may be newly added within the SearchSpace IE or may be information indicating the TCI state associated with the CORESET specified by the information element (common-ControlResourcesSets) in the pdcch-ConfigCommon (the information is, for example, tci-StatesPDCCH in the SearchSpace IE).

Specifically, based on the above-described explicit information, the user terminal may link (associate) the SSB index with the CSS with the periodicity configured by the monitoringSlotPeriodicityAndOffset in the SearchSpace IE. The user terminal may detect at least one of the SSBs (beams) with all SSB indices (or actually transmitted SSB indices) and monitor the CSS corresponding to the detected SSB.

Figure 6:
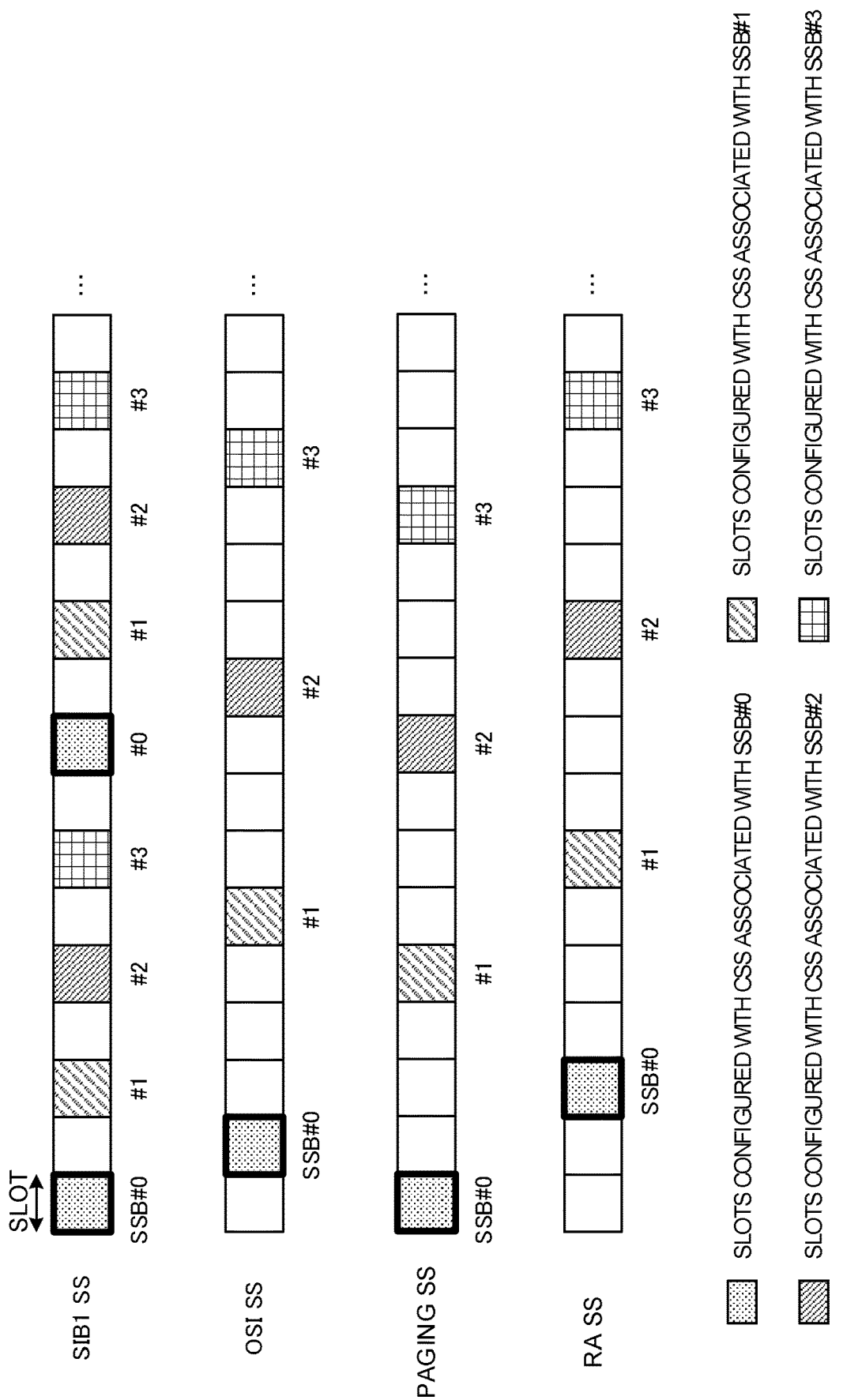
FIG. 6 is a diagram to show an example of third control of the mapping relationship between the SSB and CSS according to the first aspect.

FIG. 6 is a diagram to show an example of the third control of the mapping relationship between the SSB and CSS according to the first aspect. For example, in FIG. 6, the monitoringSlotPeriodicityAndOffset in the SearchSpace IE configures the SIB1 SS with the 2-slot periodicity and the OSI SS, paging SS, and RA SS with a 4-slot periodicity.

As shown in FIG. 6, each SIB1 SS with the 2-slot periodicity may be associated with one of SSB indices #0 to #3. Each OSI SS with the 4-slot periodicity may also be associated with one of SSB indices #0 to #3. This also applies to the paging SS and RA SS.

For example, in FIG. 6, the user terminal detects the SSB (beam) with SSB index #0 included in the SSBs (beams) with SSB indices #0 to #3. Thus, in FIG. 6, the user terminal monitors the SIB1 SS associated with SSB index #0 (here, the CSS with the 4-ms periodicity). The radio base station may transmit the DCI in a portion of the SIB1 SS with the 2-slot periodicity which portion is associated with a specific SSB index (here, SSB index #0).

The user terminal monitors the OSI SS, paging SS, and RA SS associated with SSB index #0 (here, the OSI SS, paging SS, and RA SS with a 16-ms periodicity). The radio base station may transmit the DCI in each of the OSI SS, paging SS, and RA SS associated with a specific SSB index (here, SSB index #0).

«Fourth Control»

In fourth control, at least two combinations of the first control to third control will be described. In the fourth control, different types of control for the mapping relationship between the SSB and the CSS may be applied to at least two different types of CSSs. Here, the different types of CSSs may include at least two of the SIB1 SS, OSI SS, paging SS, and RA SS.

Specifically, a control method for the mapping relationship between the SSB and CSS may be changed based on whether the DCI is transmitted in all the beams (also referred to as the SSB indices, TCI states, and so on).

For example, in a case where the DCI is not transmitted in all the beams, the user terminal may monitor, under the first control, all of the CSS configured with the periodicity indicated by the monitoringSlotPeriodicityAndOffset in the SearchSpace IE. On the other hand, in a case where the DCI is transmitted in all the beams, the user terminal may monitor, under the second or third control, only a portion of the CSS configured with the periodicity which portion is associated with a specific SSB index i.

Figure 7:
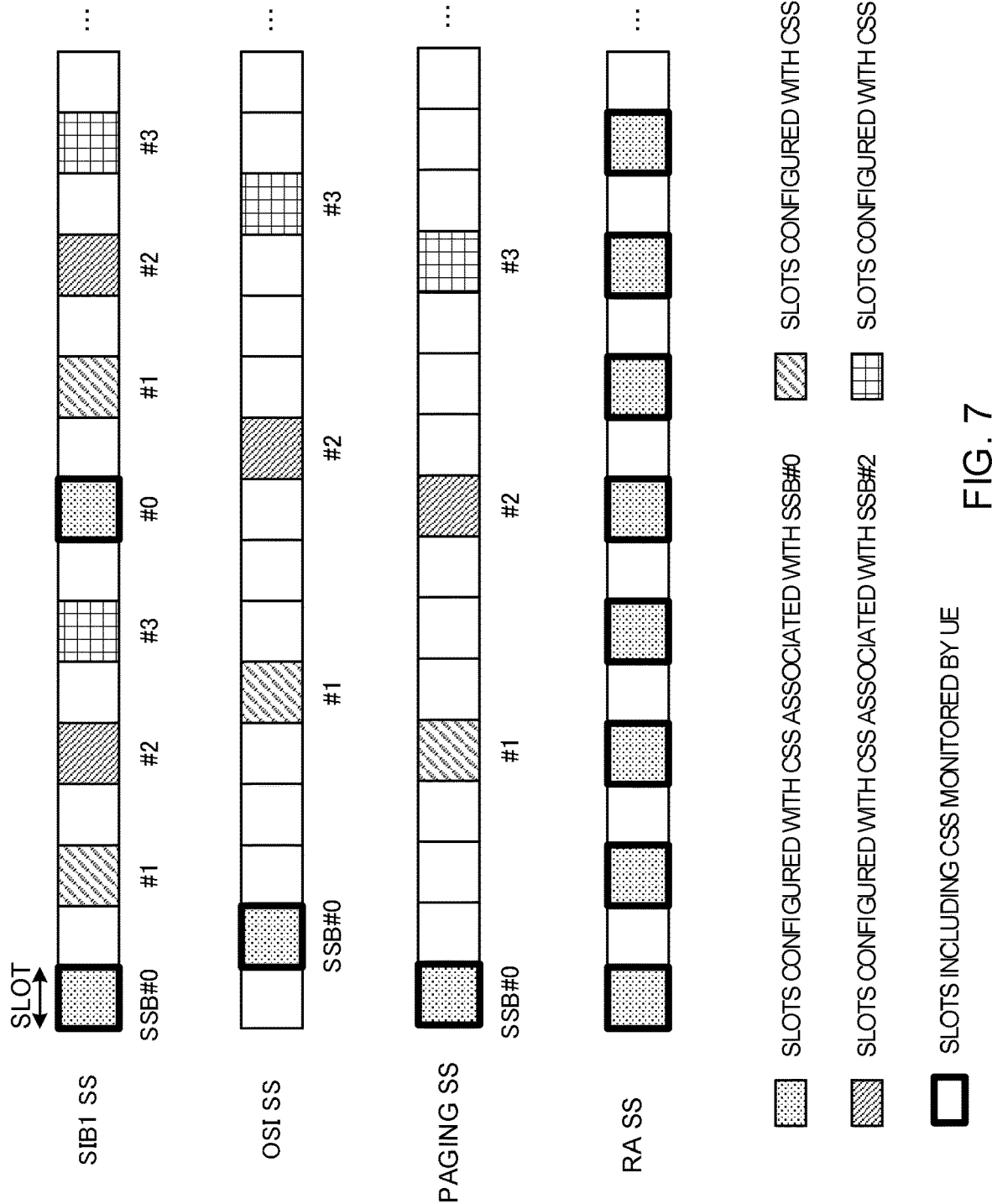
FIG. 7 is a diagram to show an example of fourth control of the mapping relationship between the SSB and CSS according to the first aspect.

FIG. 7 is a diagram to show an example of the fourth control of the mapping relationship between the SSB and CSS according to the first aspect. Note that FIG. 7 shows the first control being applied to the RA SS and the third control being applied to the paging SS, OSI SS, and SIB1 SS. Note that FIG. 7 is only illustrative and that it is sufficient that at least two of the first control to the third control are applied to the different CSSs.

As shown in FIG. 7, in a case where the user terminal monitors all of the RA SS configured with the periodicity indicated by the monitoringSlotPeriodicityAndOffset in the SearchSpace IE, the radio base station may use any beam (SSB index or TCI state) to transmit the DCI used to schedule the PDSCH transmitting a message for an RA procedure. Thus, even when a certain transmission window is provided for the message for the RA procedure, a delay in the transmission of the message can be prevented.

On the other hand, the DCI used to schedule the PDSCH transmitting the SIB1, OSI, and paging is transmitted in all the beams. Thus, the user terminal may monitor the SIB1 SS, OSI SS, and paging SS associated with a specific beam (SSB index or TCI state) (for example, in FIG. 7, SSB index #0). This enables a reduction in monitoring loads for the DCI at the user terminal.

<Control of Number of Slots Configured with CSS>

In a case where the SIB1 SS is installed based on the pdcch-ConfigSIB1 in the MIB during initial access, in multiplexing pattern 1 of the SSB and the CORESET, the time position (monitoring occasion) of the SIB1 SS is configured in two consecutive slots with a certain periodicity. On the other hand, in multiplexing patterns 2 and 3 of the SSB and the CORESET, the time position (monitoring occasion) of the SIB1 SS is configured in one consecutive slot with a certain periodicity.

Accordingly, in a case where the SIB1 SS is installed based on the pdcch-ConfigSIB1 in the MIB, whether the SIB1 SS is configured in a plurality of consecutive slots with a certain periodicity is controlled by the multiplexing pattern of the SSB and the CORESET.

On the other hand, in a case where, in the first aspect, the periodicity of the CSS (for example, at least one of the SIB1 SS, OSI SS, paging SS, and RA SS) is configured based on the pdcch-ConfigCommon, whether the CSS is configured in a plurality of consecutive slots (for example, two slots) with a certain periodicity may be explicitly or implicitly controlled.

For example, information related to the multiplexing pattern of the SSB and the CORESET (multiplexing pattern information) may be added to the pdcch-ConfigCommon. The multiplexing pattern information may be a 1-bit value indicating whether the multiplexing pattern of the SSB with the CORESET is multiplexing pattern 1 (multiplexing pattern 1 or either multiplexing pattern 2 or 3).

In a case where the multiplexing pattern information indicates multiplexing pattern 1, the user terminal may configure, in a plurality of consecutive slots (for example, two slots), the CSS with the certain periodicity and offset indicated by the monitoringSlotPeriodicityAndOffset. On the other hand, in a case where the multiplexing pattern information does not indicate multiplexing pattern 1 (indicates multiplexing pattern 2 or 3), the user terminal may configure, in a single slot, the CSS with the certain periodicity and offset indicated by the monitoringSlotPeriodicityAndOffset.

In this way, based on the multiplexing pattern of the SSB and the CORESET, the user terminal may control the number of consecutive CSS slots configured based on the pdcch-ConfigCommon.

In a case of determining whether the CSS is implicitly configured in a plurality of consecutive slots with a certain periodicity (multiplexing pattern), the user terminal may make the determination based on a positional relationship between a frequency resource in which the CORESET is configured and a frequency resource for the SSB. Specifically, in the first aspect, the configuration information related to the CORESET (for example, a frequency position and a bandwidth (FrequencyDomainResources)) may be included in a ControlResourceSet IE in the pdcch-ConfigCommon. In this case, in a case where the frequency resource for the SSB is at a position included in the bandwidth configured for the CORESET, the multiplexing pattern may be determined to be multiplexing pattern 1 (that is, 2-slot consecutive monitoring). In a case where the frequency resource for the SSB is not at a position included in the bandwidth configured for the CORESET, the multiplexing pattern may be determined to be multiplexing pattern 2 or 3 (that is, 1-slot periodic monitoring).

Note that, in a case of configuring the CSS in a plurality of consecutive slots, the user terminal may configure the CSS in symbols in each of the plurality of slots which symbols are reported in the monitoringSymbolsWithinSlot in the SearchSpace IE.

As described above, in the first aspect, the value that can be configured by using the monitoringSlotPeriodicityAndOffset in the SearchSpace IE is extended according to the periodicity that can be configured based on the pdcch-ConfigSIB1 in the MIB. Thus, even when the periodicity of the CSS (for example, at least one of the SIB1 SS, OSI SS, paging SS, and RA SS) is configured based on the pdcch-ConfigCommon, the periodicity that can be configured based on the pdcch-ConfigSIB1 in the MIB (for example, at least one of the 40-, 80-, 160-, 320-, 640-, and 1280-slot periodicity) can be configured.

(Second Aspect)

In a second aspect, at least one of the SIB1 SS, OSI SS, paging SS, and RA SS may be configured based on a parameter different from the SearchSpace IE including the monitoringSlotPeriodicityAndOffset described above (the parameter includes, for example, at least some of the bits of the pdcch-ConfigSIB1).

Figure 8:
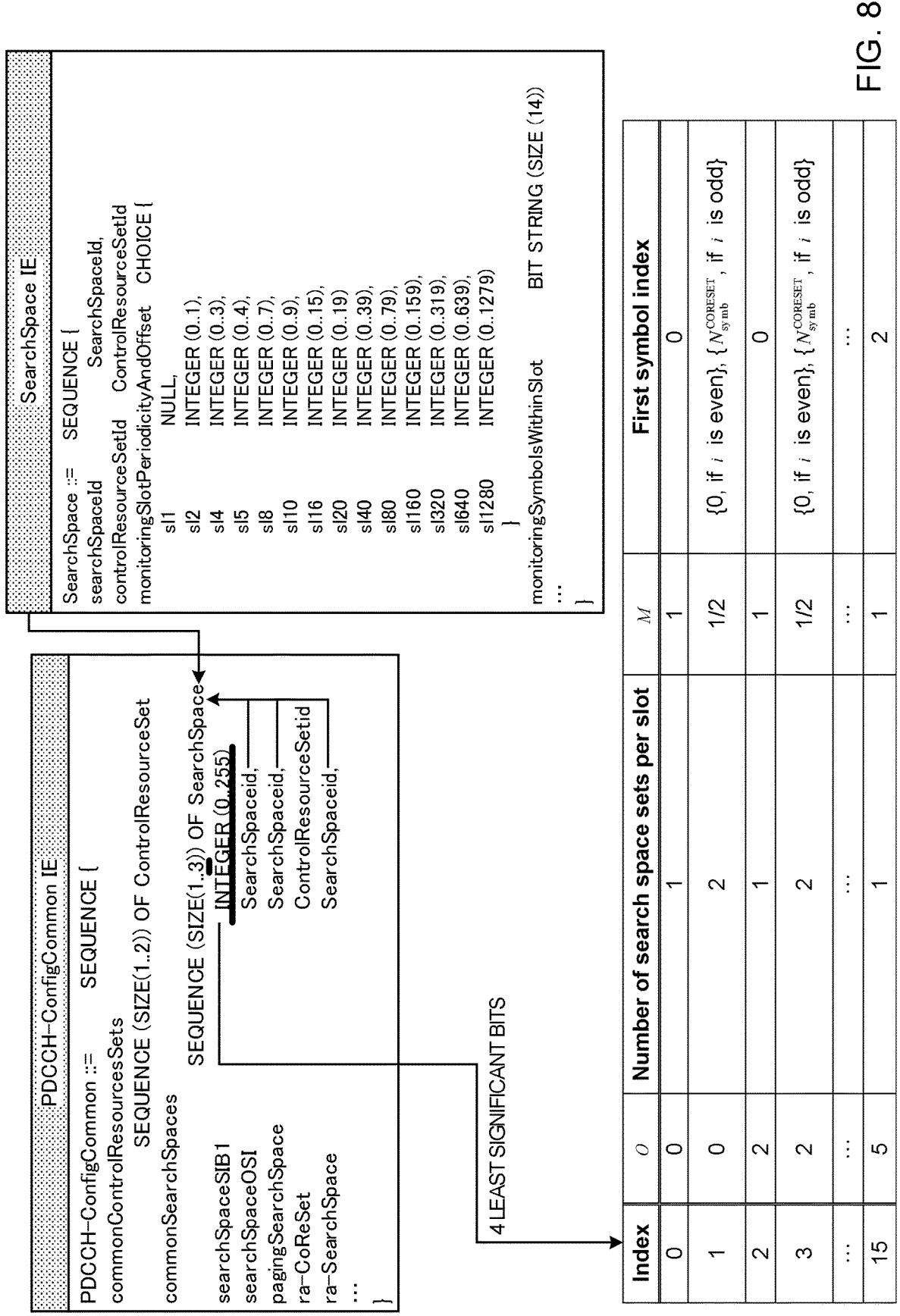
FIG. 8 is a diagram to show an example of a PDCCH-ConfigCommon IE according to a second aspect.

FIG. 8 is a diagram to show an example of the PDCCH-ConfigCommon IE according to the second aspect. In FIG. 8, the SIB1 SS is configured based on indices each including bits identical in number to the bits of the pdcch-ConfigSIB1 in the MIB. As shown in FIG. 8, like the pdcch-ConfigSIB1 in the MIB (see FIG. 1), searchSpace SIB1 in the PDCCH- ConfigCommon may be defined as integer values (for example, 0 to 255) each expressed by the certain number of bits (for example, 8 bits).

As shown in FIG. 8, the user terminal may configure the SIB1 SS in a certain number of slots (for example, two slots) starting with the slot $n_0$ determined based on the group time offset $O \cdot 2^\mu$ determined based on indices each indicated by the searchSpace SIB1 and an offset (i·M) based on a multiplication result of the SSB index i and the coefficient M (for example, see FIG. 1).

In FIG. 8, the user terminal may configure the periodicity of the SIB1 SS equal to the periodicity of the SSB. Alternatively, information indicating the periodicity of the SIB1 SS (SIB1 SS periodicity information) may be separately reported to the user terminal. For example, the SIB1 SS periodicity information may added into the PDCCH-ConfigCommon. Addition of the SIB1 SS periodicity information enables the SIB1 SS to be configured with periodicity different from the periodicity of the SSB.

Note that the table associated with the index indicate by the searchSpaceSIB1 is not limited to the table shown in FIG. 8 and that the values of the parameters may be changed. A table (for example, Table 13-13, 13-14, or 13-15 in TS38.213 v15 1.0) may be used that associates the PDCCH monitoring occasion indicating the SFN and the slot number with the first symbol index in the slot.

On the other hand, as shown in FIG. 8, the user terminal may configure the OSI SS, paging SS, or RA SS, based on the SearchSpace IE indicated by each of the searchSpaceOtherSystemInformation, pagingSearchSpace, and ra-SearchSpace. In FIG. 8, up to three CSSs including the OSI SS, paging SS, and RA SS are configured by using the SearchSpace IE, and thus the maximum number of SearchSpace IEs included in the commonSearchSpaces IE in the PDCCH-ConfigCommon may be changed to 3 (see FIG. 4).

In FIG. 8, in a case where the commonControlResourcesSets IE in the PDCCH-ConfigCommon indicates two CORESETs, one of the CORESETs may include the OSI SS and paging SS, while the other CORESET may include the RA SS.

In FIG. 8, the searchSpaceSIB1 in the PDCCH-ConfigCommon, used to configure the SIB1 SS, is defined similarly to the pdcch-ConfigSIB1 in the MIB, and thus even when the periodicity of the SIB1 SS is configured based on the pdcch-ConfigCommon, the same periodicity as the periodicity that can be configured based on the pdcch-ConfigSIB1 in the MIB can be configured.

Figure 9:
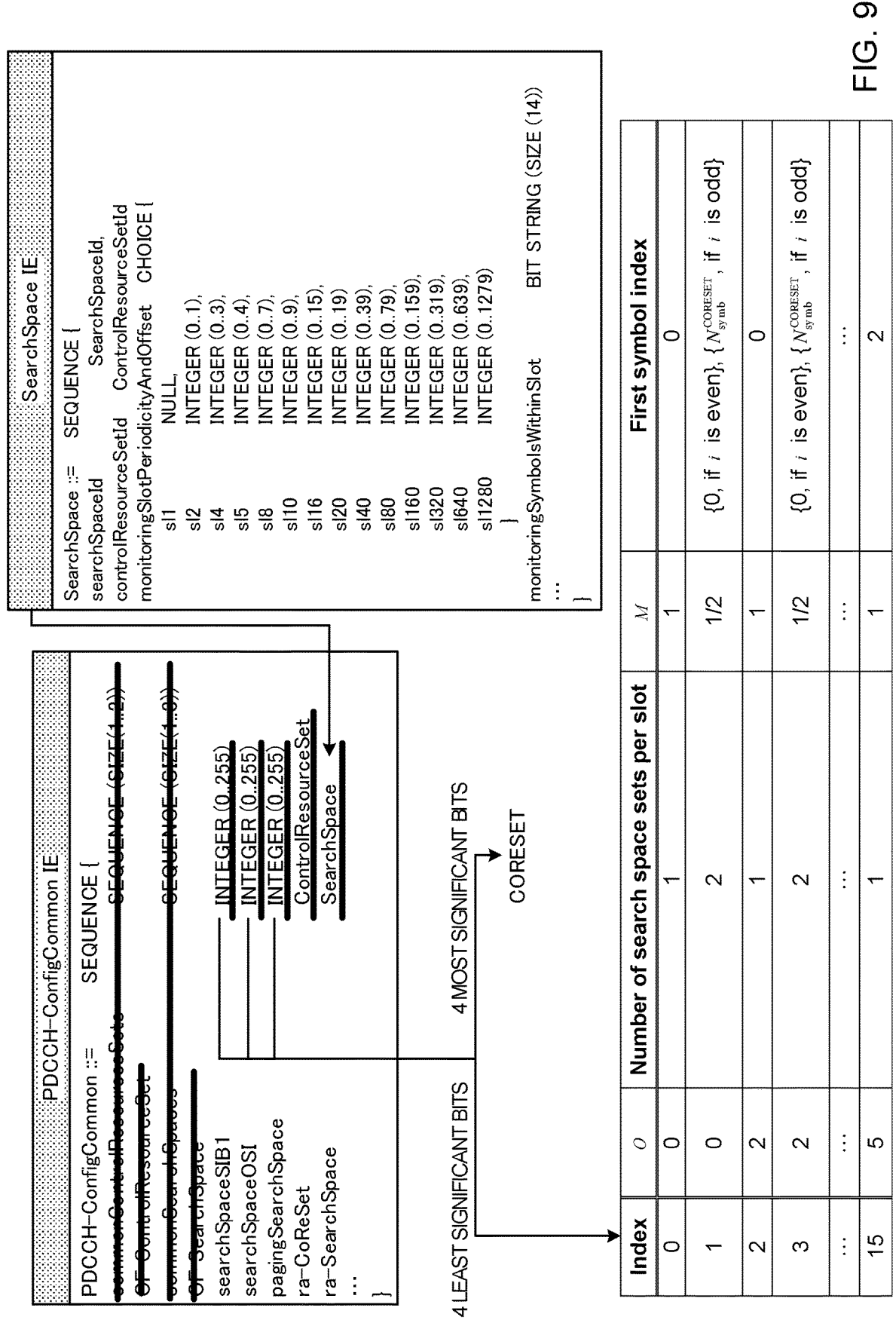
FIG. 9 is a diagram to show another example of the PDCCH-ConfigCommon IE according to the second aspect.

FIG. 9 is a diagram to show another example of the PDCCH-ConfigCommon IE according to the second aspect. FIG. 9 differs from FIG. 8 in that the OSI SS and paging SS as well as SIB1 SS are configured based on indices each including bits identical in number to the bits of the pdcch-ConfigSIB1. With reference to FIG. 9, the difference from FIG. 8 will be mainly described.

As shown in FIG. 9, like the pdcch-ConfigSIB1 in the MIB (see FIG. 1), the searchSpaceSIB1, searchSpaceOtherSystemInformation, and pagingSearchSpace in the PDCCH-ConfigCommon may be defined as integer values (for example, 0 to 255) each expressed by a certain number of bits (for example, 8 bits).

For example, as shown in FIG. 9, in a case where the searchSpaceSIB1, searchSpaceOtherSystemInformation, and pagingSearchSpace in the PDCCH-ConfigCommon are defined as 8-bit integer values, the 4 least significant bits of the 8 bits may be used to configure each of the SIB1 SS, OSI SS, and paging SS, and the 4 most significant bits of the 8 bits may be used to configure the CORESET for each of the SIB1 SS, OSI SS, and paging SS. In this case, the commonControlResourcesSets IE specifying up to two CORESETs in the PDCCH-ConfigCommon is unnecessary and may thus be removed, and only the information (ra-CoReSet) indicating a single CORESET including the RA SS may be included in the PDCCH-ConfigCommon.

The ra-SearchSpace indicating the RA SS in the PDCCH-ConfigCommon may be changed to directly reference the SearchSpace IE instead of referencing the identifier of the SearchSpace IE (searchSpaceId) included in the commonSearchSpaces in the PDCCH-ConfigCommon (see FIG. 8). In this case, the commonSearchSpaces IE in the PDCCH-ConfigCommon is unnecessary and may thus be removed.

In FIG. 9, the user terminal may configure the periodicity of each of the SIB1 SS, OSI SS, and paging SS equal to the periodicity of the SSB. Alternatively, the SIB1 SS periodicity information, information indicating the periodicity of the OSI SS (OSI SS periodicity information), and information indicating the periodicity of the paging SS (paging SS periodicity information) may be separately reported to the user terminal. For example, the SIB1 SS periodicity information, OSI SS periodicity information, and paging SS periodicity information may each be added into the PDCCH-ConfigCommon, or a single parameter indicating each periodicity may be added into the PDCCH-ConfigCommon.

Figure 10:
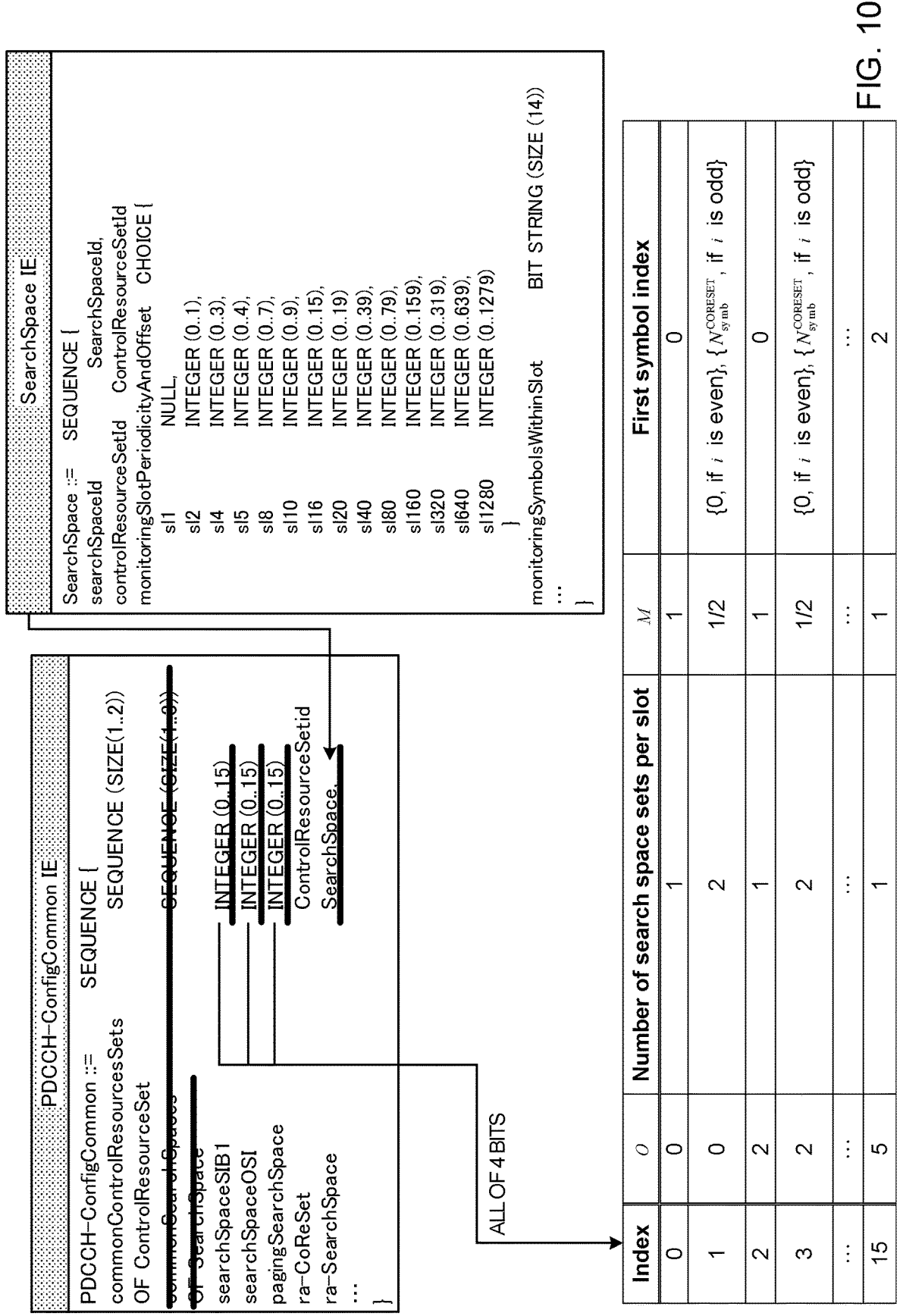
FIG. 10 is a diagram to show another example of the PDCCH-ConfigCommon IE according to the second aspect.

FIG. 10 is a diagram to show yet another example of the PDCCH-ConfigCommon IE according to the second aspect. FIG. 10 differs from FIGS. 8 and 9 in that the configuration is based on indices each indicated by some of the bits of the pdcch-ConfigSIB1 (for example, the 4 least significant bits). With reference to FIG. 10, the difference from FIGS. 8 and 9 will be mainly described.

As shown in FIG. 10, like some of the bits (for example, the 4 least significant bits) of the pdcch-ConfigSIB1 in the MIB (see FIG. 1), the searchSpaceSIB1, searchSpaceOtherSystemInformation, and pagingSearchSpace in the PDCCH-ConfigCommon may be defined as integer values (for example, 0 to 15) each expressed by a certain number of bits (for example, 4 bits).

For example, as shown in FIG. 10, in a case where the searchSpaceSIB1, searchSpaceOtherSystemInformation, and pagingSearchSpace in the PDCCH-ConfigCommon are defined as 4-bit integer values, the 4 bits may be used to configure each of the SIB1 SS, OSI SS, and paging SS. In this case, the CORESET for each of the SIB1 SS, OSI SS, and paging SS may be configured based on the commonControlResourcesSets IE specifying up to two CORESETs in the PDCCH-ConfigCommon.

The ra-SearchSpace indicating the RA SS in the PDCCH-ConfigCommon may be changed to directly reference the SearchSpace IE instead of referencing the identifier of the SearchSpace IE (searchSpaceId) included in the commonSearchSpaces in the PDCCH-ConfigCommon (see FIG. 8). In this case, the commonSearchSpaces IE in the PDCCH-ConfigCommon is unnecessary and may thus be removed.

Note that, in FIGS. 8 to 10, at least a part of the pdcch-ConfigSIB1 in the MIB (see FIG. 1) is not used for configuration of the RA SS but that, like the other CSSs, the RA SS may be configured based on at least a part of the pdcch-ConfigSIB1 in the MIB.

In FIGS. 8 to 10, in a case where the CSS is configured based on at least a part of the pdcch-ConfigSIB1 in the MIB (see FIG. 1), the periodicity of the CSS (monitoring periodicity) (for example, at least one of the SIB1 SS, OSI SS, paging SS, and RA SS) may be configured based on the periodicity of the SSB.

For example, the user terminal may reference information indicating the periodicity of the SSB (ssb-periodicityServingCell) to configure, as the periodicity of the above-described CSS, the periodicity indicated by the ssb-periodicityServingCell (for example, one of 5, 10, 20, 40, 80, or 160 ms).

Alternatively, the user terminal may reference the information indicating the periodicity of the SSB (ssb-periodicityServingCell) to configure the periodicity of the above-described CSS, based on a ratio to the periodicity indicated by the ssb-periodicityServingCell (for example, one of 5, 10, 20, 40, 80, or 160 ms). The user terminal may receive information (ratio information) indicating the ratio (for example, 0.25, 0.5, 1, 2, 4, or 8) from the radio base station. The user terminal may receive the ratio information for each CSS type.

The user terminal may implicitly report information related to the search space, based on the multiplexing pattern of the SSB and the CORESET. This is equivalent to, for example, omission of use of the 4 least significant bits of the pdcchConfigSIB1 for multiplexing pattern 2 or 3, in Tables 13-13, 13-14, and 13-15 of chapter 13 in TS38.213 v15 1.0. Thus, in a case where multiplexing pattern 2 or 3 is reported, at least some of the indices may be omitted each of which is constituted of bits identical in number to or smaller in number than the bits of each index in the MIB (see, for example, FIG. 10).

Alternatively, in a case where at least some of the indices are omitted each of which is constituted of bits identical in number to or smaller in number than the bits of each index in the MIB (see, for example, FIG. 10), the user terminal may interpret the omission as meaning that multiplexing pattern 2 or 3 is reported.

In a second aspect, at least one of the SIB1 SS, OSI SS, paging SS, and RA SS is configured based on a parameter different from the SearchSpace IE including the monitoringSlotPeriodicityAndOffset described above (the parameter includes, for example, at least some of the bits of the pdcch-ConfigSIB1). Thus, even when the periodicity of the CSS is configured based on the pdcch-ConfigCommon, the periodicity that can be configured based on the pdcch-ConfigSIB1 in the MIB can be configured with addition of bits to the monitoringSlotPeriodicityAndOffset suppressed.

As described in the second aspect, in a case where indices each of which is the same as at least some of the bits of the pdcchConfigSIB1 is used as the searchSpaceSIB1, it is conceivable that the pdcchConfigSIB1 in the MIB (PBCH) may report the same contents. Thus, in the handover procedure and the addition procedure with at least one of the PSCell and the SCells, in a case where the searchSpaceSIB1 is not indicated in the pdcch-ConfigCommon, the MIBs in a target cell and an additional cell are directly read to allow acquisition of configuration information related to the CSS (for example, the SIB1 SS) in the target cell and in the additional cell. This is utilized as follows. In a case where the pdcch-ConfigCommon does not include the searchSpaceSIB1, the user terminal may read the PBCH in the target cell and in the additional cell, and in contrast, in a case where the pdcch-ConfigCommon includes the searchSpaceSIB1, the user terminal may interpret the inclusion as meaning that the user terminal need not read the PBCH.

(Radio Communication System)

Hereinafter, a structure of a radio communication system according to the present embodiment will be described. In this radio communication system, the radio communication method according to each embodiment of the present disclosure described above may be used alone or may be used in combination for communication.

Figure 11:
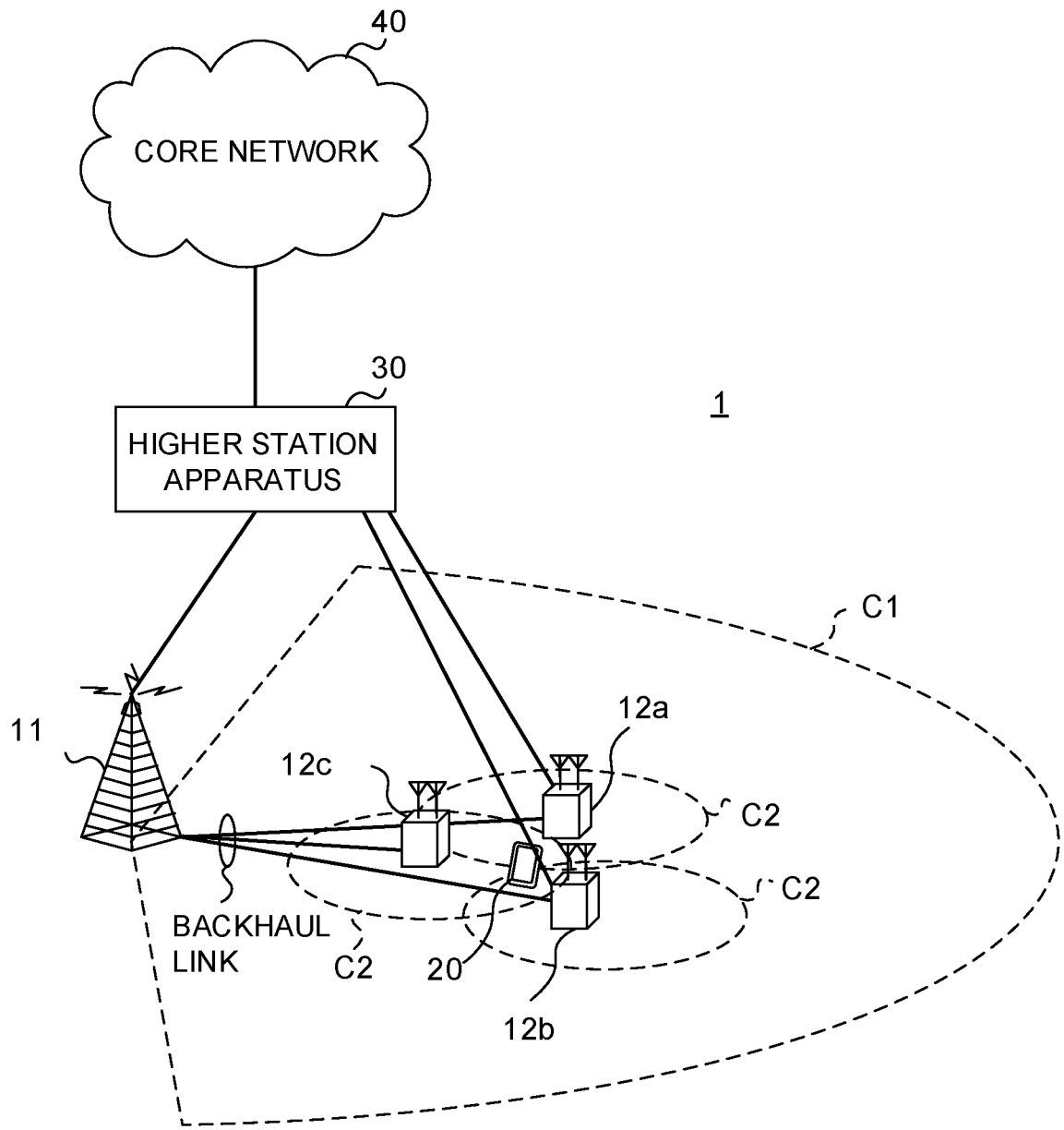
FIG. 11 is a diagram to show an example of a schematic structure of a radio communication system according to the present embodiment.

FIG. 11 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported in the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 12:
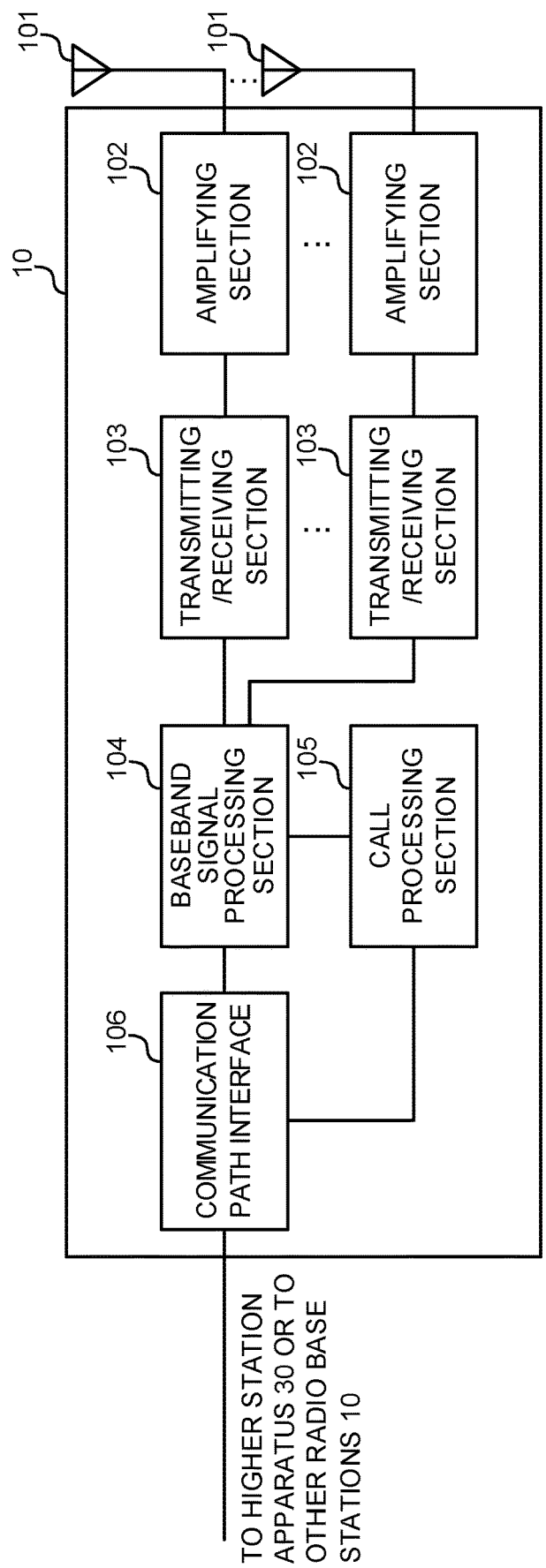
FIG. 12 is a diagram to show an example of an overall structure of a radio base station according to the present embodiment.

FIG. 12 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 may transmit information related to the common search space, configured to enable configuration of at least the periodicity of the search space for the system information block (SIB) 1 configured based on the index in the master information block (MIB).

Figure 13:
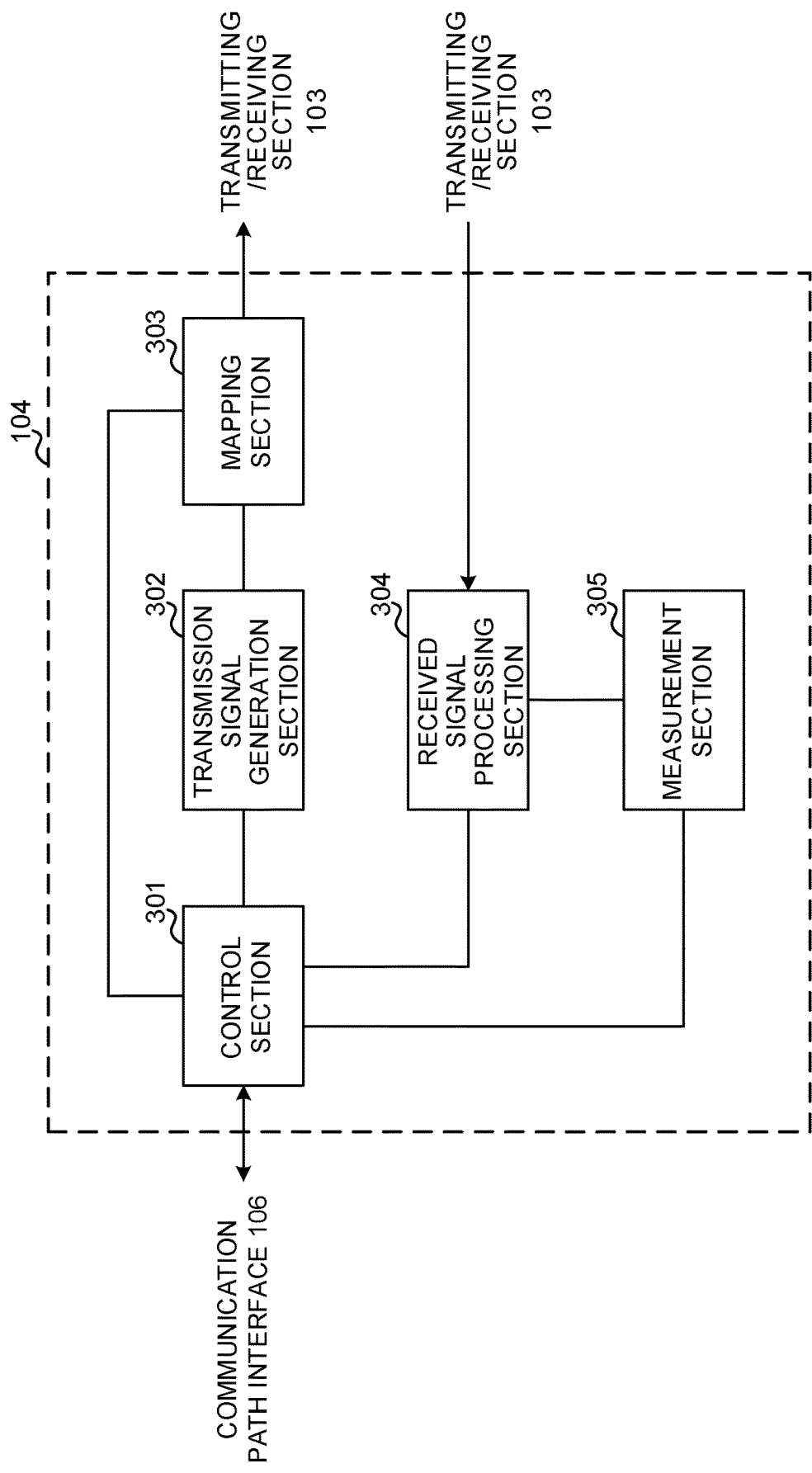
FIG. 13 is a diagram to show an example of a functional structure of the radio base station according to the present embodiment.

FIG. 13 is a diagram to show an example of a functional structure of the radio base station according to the present embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), and a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH. Transmission confirmation information, and so on), a random access preamble (for example, a signal transmitted on the PRACH), an uplink reference signal, and so on.

The control section 301 may perform control of transmitting the DCI by using the CORESET. The control section 301 may perform, in a specific search space, control of generating DCI using a specific DCI format and an RNTI corresponding to the format and transmitting the DCI.

The control section 301 may control transmission of downlink control information in the above-described common search space configured based on the information related to the above-described common search space.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

<User Terminal>

Figure 14:
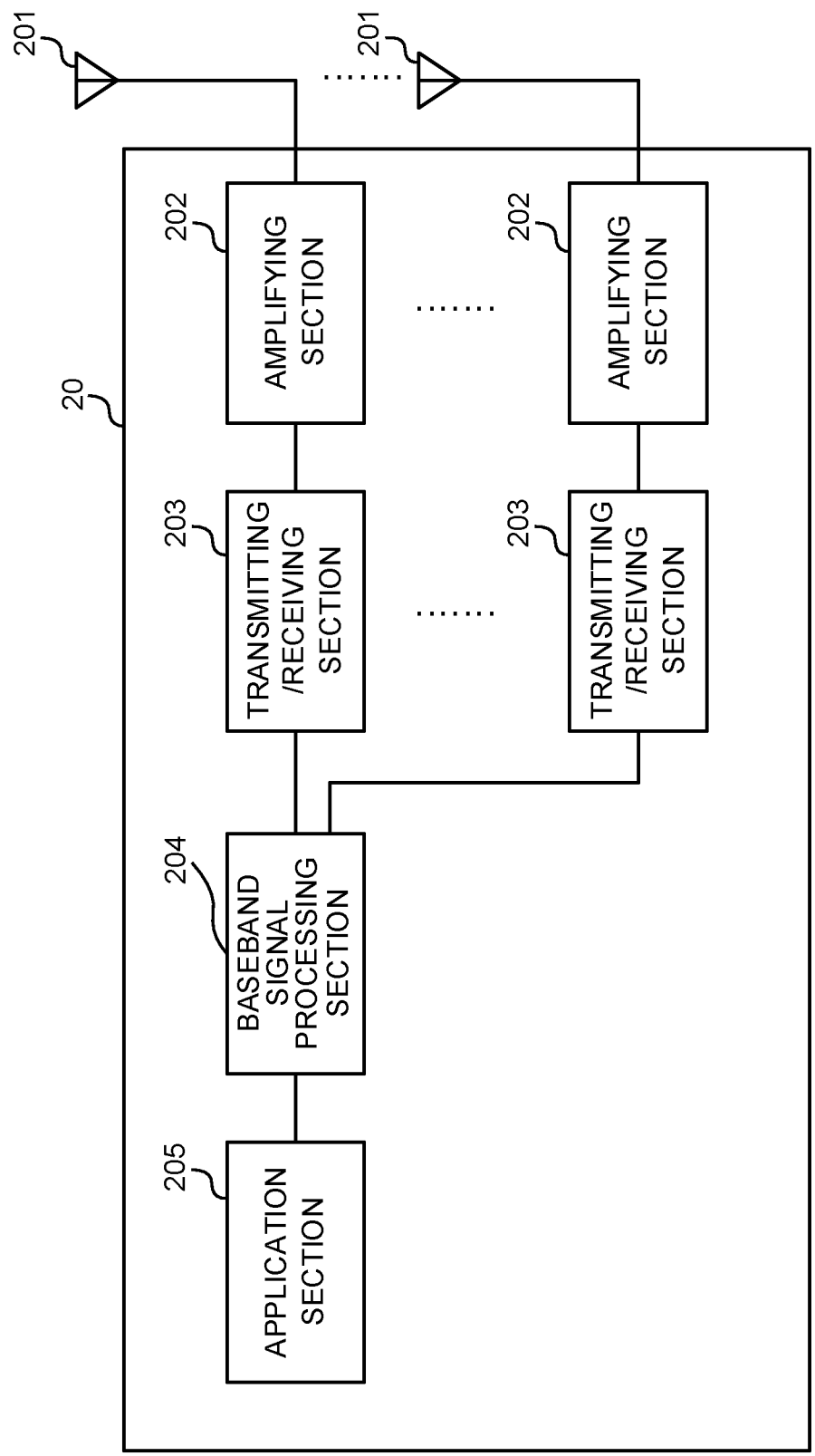
FIG. 14 is a diagram to show an example of an overall structure of a user terminal according to the present embodiment.

FIG. 14 is a diagram to show an example of an overall structure of a user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 may receive information related to the common search space, configured to enable configuration of at least the periodicity of the search space for the system information block (SIB) 1 configured based on the index in the master information block (MIB).

Figure 15:
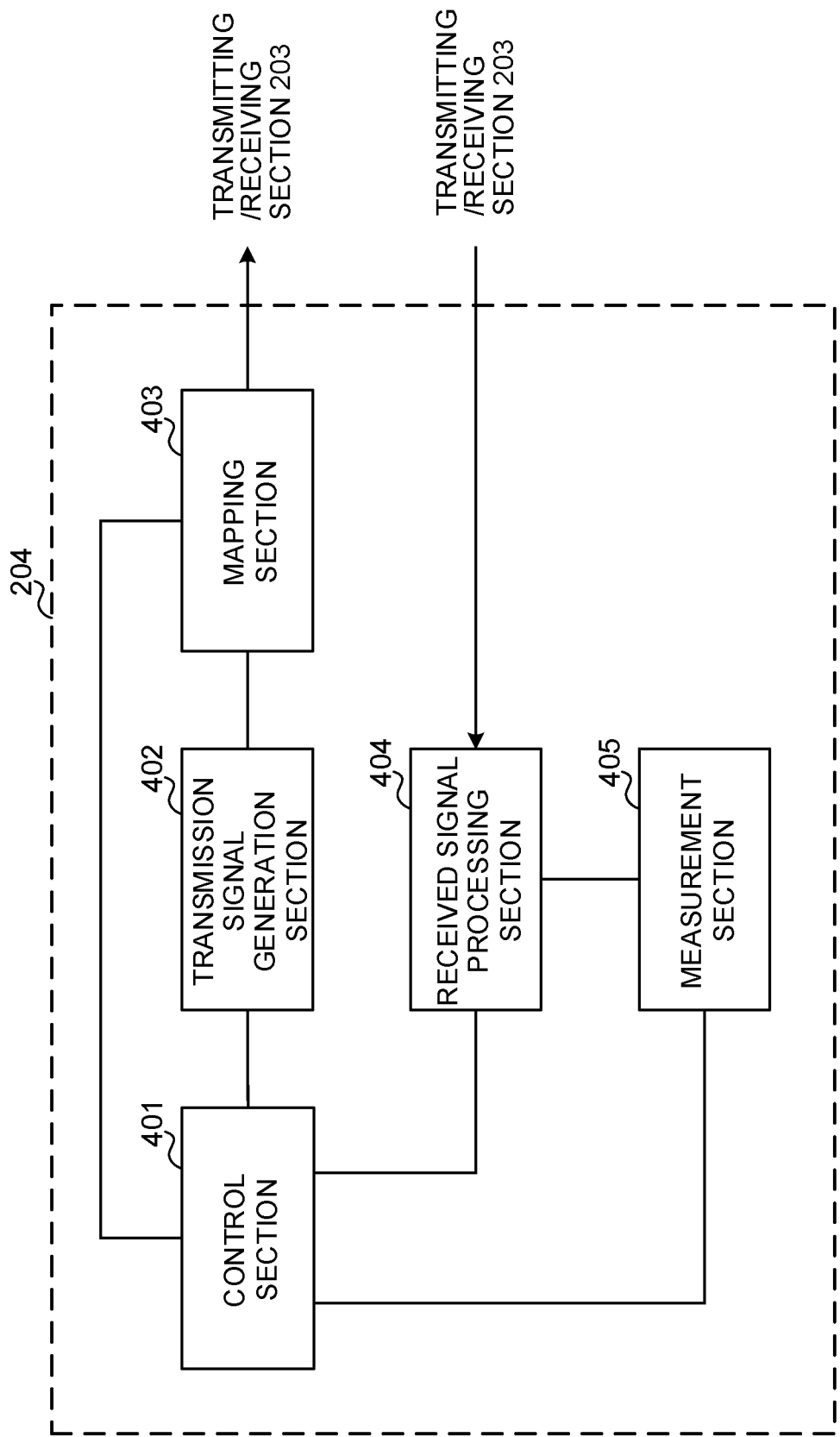
FIG. 15 is a diagram to show an example of a functional structure of the user terminal according to the present embodiment.

FIG. 15 is a diagram to show an example of a functional structure of the user terminal according to the present embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may control monitoring of downlink control information in the above-described common search space configured based on the information related to the above-described common search space.

The information related to the common search space may include periodicity information configured to enable configuration of at least the periodicity of the search space for the SIB1 configured based on the indices in the master information block (MIB). The control section 401 may configure the above-described common search space with the periodicity indicated by the above-described periodicity information (first aspect).

The control section 401 may monitor the above-described downlink control information in all of the above-described common search spaces configured with the above-described periodicity, regardless of an index of a synchronization signal block (first aspect, first control, and fourth control).

The control section 401 may monitor the above-described downlink control information in the common search space corresponding to the index of a specific synchronization signal block and included in the common search spaces configured with the above-described periodicity (first aspect, and second control to fourth control).

The information related to the common search space may be an index constituted of bits identical in number to or smaller in number than bits of each index in the MIB. The control section 401 may configure the above-described common search space with the periodicity configured based on the index (second aspect).

The common search space may include at least one of the search space for SIB (System Information Block) 1, the search space for OSI (Other System Information), the search space for paging, and the search space for random access.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 16:
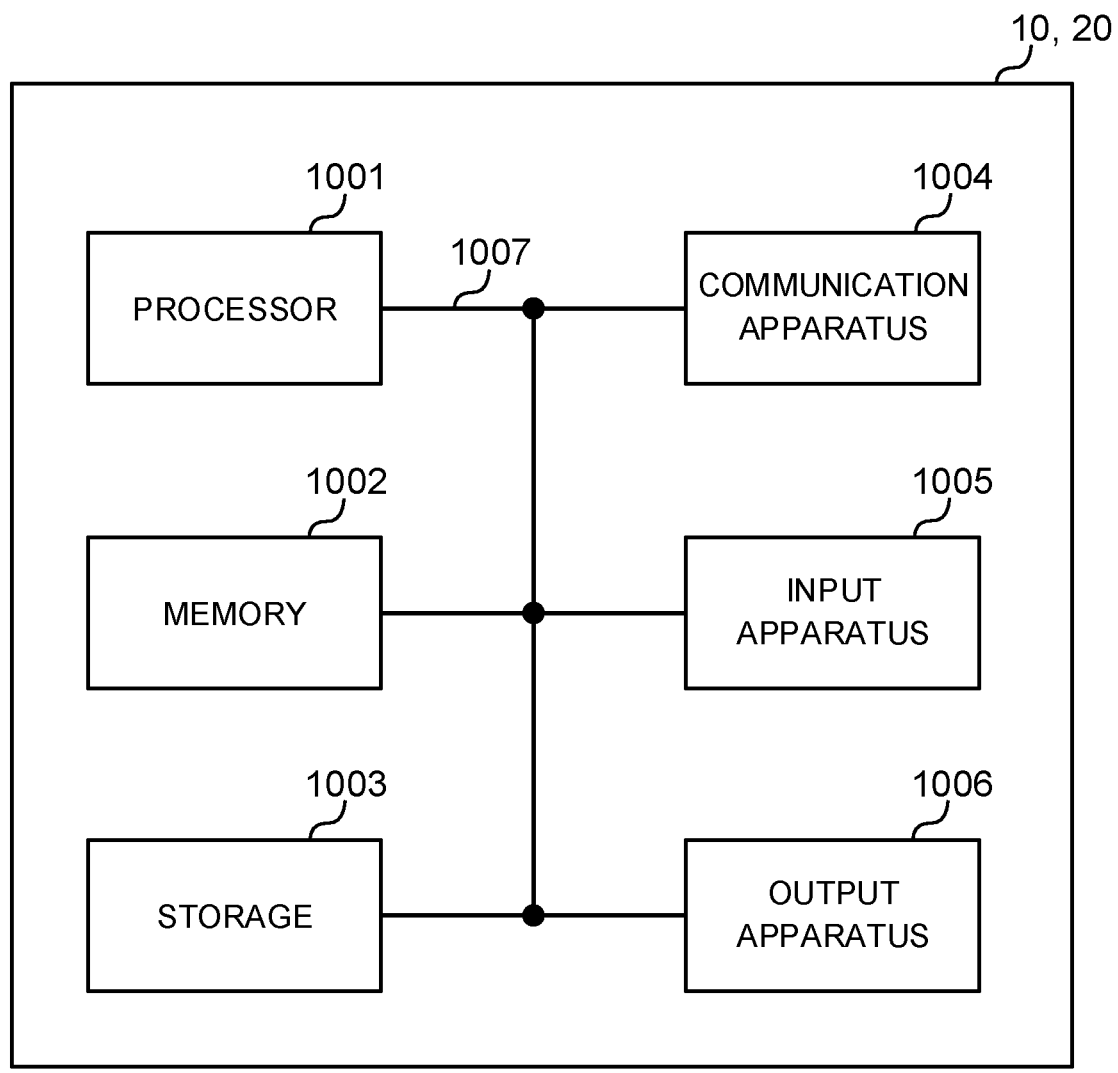
FIG. 16 is a diagram to show an example of a hardware structure of the radio base station and the user terminal according to the present embodiment.

For example, a radio base station, a user terminal, and so on according to the present embodiment of the present disclosure may function as a computer that executes the processes of the radio communication method of the present disclosure. FIG. 16 is a diagram to show an example of a hardware structure of the radio base station and the user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to the present embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described in this specification. The invention according to the present disclosure can be implemented with various corrections and in various modifications, without departing from the spirit and scope of the invention defined by the recitations of claims. Consequently, the description in this specification is provided only for the purpose of explaining examples, and should by no means be construed to limit the invention according to the present disclosure in any way.

The invention claimed is:

1. A terminal comprising:
a receiver that receives, by Radio Resource Control (RRC) signaling, configuration information regarding a physical downlink control channel (PDCCH) to configure a common search space; and
a processor that monitors downlink control information in the common search space based on the configuration information,
wherein the configuration information includes information, regarding a search space, that corresponds to bits in an index of a master information block (MIB) and information regarding a search space index associated with a given search space,
monitoring periodicity provided by the configuration information includes a periodicity that is configurable based on the index in the MIB,
the receiver receives information indicative of a synchronization signal block index, the synchronization signal block index being transmitted in a set including one or more synchronization signal blocks,
the downlink control information for a random access response is associated with one synchronization signal block index,
when the common search space is a random access search space for the random access response, the processor monitors the common search space based on monitoring periodicity provided by the configuration information, and
when the common search space comprises at least one of an Other System Information (OSI) search space and a paging search space:
monitoring of the downlink control information in the common search space is associated with a synchronization signal block based on the information indicative of the synchronization signal block index, and
the processor monitors the common search space based on the monitoring periodicity provided by the configuration information and the information indicative of the synchronization signal block index.

2. A radio communication method for a terminal, comprising:
receiving, by Radio Resource Control (RRC) signaling, configuration information regarding a physical downlink control channel (PDCCH) to configure a common search space; and
monitoring downlink control information in the common search space based on the configuration information,
wherein the configuration information includes information, regarding a search space, that corresponds to bits in an index of a master information block (MIB) and information regarding a search space index associated with a given search space,
monitoring periodicity provided by the configuration information includes a periodicity that is configurable based on the index in the MIB,
the terminal receives information indicative of a synchronization signal block index, the synchronization signal block index being transmitted in a set including one or more synchronization signal blocks,
the downlink control information for a random access response is associated with one synchronization signal block index,
when the common search space is a random access search space for the random access response, the terminal monitors the common search space based on monitoring periodicity provided by the configuration information, and
when the common search space comprises at least one of an Other System Information (OSI) search space and a paging search space:
monitoring of the downlink control information in the common search space is associated with a synchronization signal block based on the information indicative of the synchronization signal block index, and
the terminal monitors the common search space based on the monitoring periodicity provided by the configuration information and the information indicative of the synchronization signal block index.

3. A base station comprising:
a transmitter configured to transmit, by Radio Resource Control (RRC) signaling, configuration information regarding a physical downlink control channel (PDCCH) to configure a common search space; and
a processor that controls transmission of downlink control information in the common search space based on the configuration information,
wherein the configuration information includes information, regarding a search space, that corresponds to bits in an index of a master information block (MIB) and information regarding a search space index associated with a given search space,
monitoring periodicity provided by the configuration information includes a periodicity that is configurable based on the index in the MIB,
the transmitter transmits information indicative of a synchronization signal block index, the synchronization signal block index being transmitted in a set including one or more synchronization signal blocks,
the downlink control information for a random access response is associated with one synchronization signal block index,
when the common search space is a random access search space for the random access response, monitoring of the common search space is based on monitoring periodicity provided by the configuration information, and when the common search space comprises at least one of an Other System Information (OSI) search space and a paging search space:

monitoring of the downlink control information in the common search space is associated with a synchronization signal block based on the information indicative of the synchronization signal block index, and monitoring the common search space is based on the monitoring periodicity provided by the configuration information and the information indicative of the synchronization signal block index.

4. A system comprising a base station and a terminal, wherein:

the base station comprises:
　a transmitter configured to transmit, by Radio Resource Control (RRC) signaling, configuration information regarding a physical downlink control channel (PDCCH) to configure a common search space; and
　a processor that controls transmission of downlink control information in the common search space based on the configuration information; and the terminal comprises:
　a receiver that receives the configuration information regarding the PDCCH to configure the common search space; and
　a processor that monitors the downlink control information in the common search space based on the configuration information, wherein the configuration information includes information, regarding a search space, that corresponds to bits in an index of a master information block (MIB) and information regarding a search space index associated with a given search space, monitoring periodicity provided by the configuration information includes a periodicity that is configurable based on the index in the MIB, the receiver receives information indicative of a synchronization signal block index, the synchronization signal block index being transmitted in a set including one or more synchronization signal blocks, the downlink control information for a random access response is associated with one synchronization signal block index, when the common search space is a random access search space for the random access response, the processor of the terminal monitors the common search space based on monitoring periodicity provided by the configuration information, and when the common search space comprises at least one of an Other System Information (OSI) search space and a paging search space:

monitoring of the downlink control information in the common search space is associated with a synchronization signal block based on the information indicative of the synchronization signal block index, and the processor of the terminal monitors the common search space based on the monitoring periodicity provided by the configuration information and the information indicative of the synchronization signal block index.

* * * * *